(12) United States Patent
Daikoku et al.

(10) Patent No.: US 11,193,782 B2
(45) Date of Patent: Dec. 7, 2021

(54) VEHICLE POSITION ESTIMATION APPARATUS

(71) Applicant: Mitsubishi Electric Corporation, Chiyoda-ku (JP)

(72) Inventors: Kentaro Daikoku, Tokyo (JP); Yuji Igarashi, Tokyo (JP); Masahiko Ikawa, Tokyo (JP); Masatoshi Fujii, Tokyo (JP); Takashi Irie, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 194 days.

(21) Appl. No.: 16/481,149

(22) PCT Filed: Dec. 18, 2017

(86) PCT No.: PCT/JP2017/045319
§ 371 (c)(1),
(2) Date: Jul. 26, 2019

(87) PCT Pub. No.: WO2018/179616
PCT Pub. Date: Oct. 4, 2018

(65) Prior Publication Data
US 2020/0240806 A1    Jul. 30, 2020

(30) Foreign Application Priority Data

Mar. 27, 2017  (JP) .............................. JP2017-060384

(51) Int. Cl.
*G01C 21/36*    (2006.01)
*G01S 19/42*    (2010.01)
(Continued)

(52) U.S. Cl.
CPC ........ *G01C 21/3602* (2013.01); *G01S 19/426* (2013.01); *G06K 9/00798* (2013.01);
(Continued)

(58) Field of Classification Search
CPC .......... B60W 2530/00; B60W 2552/00; G01C 21/3602; G01C 21/3658; G01C 21/3819;
(Continued)

(56) References Cited

U.S. PATENT DOCUMENTS 7,862,177 B2 * 1/2011 Kubota .................... B60Q 1/50
353/13
7,974,780 B2 * 7/2011 Nakayama ....... G08G 1/096883
701/437

(Continued)

FOREIGN PATENT DOCUMENTS

JP    2005-202678 A    7/2005
JP    2007-278813 A    10/2007
(Continued)

OTHER PUBLICATIONS

International Search Report dated Jan. 30, 2018 in PCT/JP2017/045319 filed Dec. 18, 2017.

*Primary Examiner* — Babar Sarwar
(74) *Attorney, Agent, or Firm* — Xsensus LLP

(57) ABSTRACT

A vehicle position estimation apparatus according to the present invention includes a painted line recognition result processing unit configured to calculate whether the vehicle has made a lane change and a direction of the lane change when the vehicle has made the lane change, a vehicle lateral position calculating unit configured to calculate a lane where the vehicle is in travel and a vehicle lateral position that is a lateral position of the vehicle in the lane based on whether the vehicle has made the lane change, the direction of the lane change, and a lane connection relation, and an on-map vehicle position calculating unit configured to calculate an on-map position of the vehicle on the road based on a map information, the lane where the vehicle is in travel, the vehicle lateral position, and a forward travel distance.

6 Claims, 14 Drawing Sheets

(51) Int. Cl.
*G06K 9/00* (2006.01)
*G08G 1/04* (2006.01)

(52) U.S. Cl.
CPC ........... *G08G 1/04* (2013.01); *B60W 2530/00* (2013.01); *B60W 2552/00* (2020.02)

(58) Field of Classification Search
CPC .... G01S 19/426; G06K 9/00798; G08G 1/04; G08G 1/167
See application file for complete search history.

(56) References Cited

U.S. PATENT DOCUMENTS

| | | | | |
|---|---|---|---|---|
| 9,672,734 | B1* | 6/2017 | Ratnasingam | G08G 1/0968 |
| 9,836,977 | B1* | 12/2017 | Cashier | G06F 40/30 |
| 10,352,714 | B2* | 7/2019 | Nakajima | G01C 21/3602 |
| 2004/0215393 | A1* | 10/2004 | Matsumoto | B62D 15/025 |
| | | | | 701/300 |
| 2005/0273260 | A1* | 12/2005 | Nishida | B60Q 1/346 |
| | | | | 701/301 |
| 2009/0030613 | A1* | 1/2009 | Kataoka | G08G 1/167 |
| | | | | 701/300 |
| 2009/0167560 | A1* | 7/2009 | Becker | G08G 1/167 |
| | | | | 340/903 |
| 2009/0205936 | A1* | 8/2009 | Ueno | B60Q 1/42 |
| | | | | 200/61.28 |
| 2009/0265070 | A1* | 10/2009 | Okada | B60W 50/0098 |
| | | | | 701/70 |
| 2010/0231718 | A1* | 9/2010 | Nakamori | G06K 9/00798 |
| | | | | 348/148 |
| 2011/0010021 | A1* | 1/2011 | Kobayashi | B60T 8/17557 |
| | | | | 701/1 |
| 2012/0212612 | A1* | 8/2012 | Imai | B60W 30/12 |
| | | | | 348/148 |
| 2014/0350845 | A1* | 11/2014 | Hayashi | G01C 21/3626 |
| | | | | 701/428 |
| 2015/0344068 | A1* | 12/2015 | Taniguchi | B62D 6/003 |
| | | | | 701/41 |
| 2016/0200321 | A1* | 7/2016 | Yamada | G05D 1/021 |
| | | | | 701/96 |
| 2016/0325753 | A1* | 11/2016 | Stein | G06K 9/46 |
| 2016/0327402 | A1* | 11/2016 | Funabiki | G01C 21/365 |
| 2017/0036601 | A1* | 2/2017 | Kimura | B60R 1/00 |
| 2017/0160088 | A1* | 6/2017 | Azami | G01C 21/34 |
| 2017/0243491 | A1* | 8/2017 | Fujii | B60W 30/12 |
| 2018/0259961 | A1* | 9/2018 | Prasad | B62D 15/0255 |
| 2019/0389464 | A1* | 12/2019 | Nanri | B60W 40/10 |

FOREIGN PATENT DOCUMENTS

| | | |
|---|---|---|
| JP | 2008-102684 A | 5/2008 |
| JP | 2015-75889 A | 4/2015 |

\* cited by examiner

LANE CONNECTION RELATION

| LANE NUMBER AT PREVIOUS TRAVEL POINT | LANE NUMBER AT CURRENT TRAVEL POINT |
|---|---|
| −1 | 1 |
| 1 | 2 |
| 2 | 3 |

VEHICLE POSITION ESTIMATION APPARATUS

TECHNICAL FIELD

The present invention relates to a vehicle position estimation apparatus that estimates a current position of a vehicle.

BACKGROUND ART

In general, navigation systems hold vehicle position estimated coordinates obtained through the dead reckoning with global navigation satellite system (GNSS) coordinate information received from satellites, vehicle speed signal information calculated from a wheel speed of a vehicle, acceleration information obtained from a gyro sensor, and the like taken into consideration.

Further, when a navigation map that represents roads only with links, nodes, and attribute information associated with the links and nodes is used, a navigation system calculates a link of a road where the vehicle is in travel and a vehicle position on the link through the map matching to determine a display position of the vehicle position on the map. Note that the vehicle position on the map is also referred to as a car mark.

The above-described navigation map contains no lane-level detailed shape information and has a whole road including a plurality of lanes represented by line segments, curves, or the like. Therefore, such a navigation map does not provide map information used for estimating a lane where the vehicle is in travel or a relative position in a lateral direction of the vehicle in the lane through the map matching. The lateral direction of the vehicle is a direction orthogonal to a traveling direction of the vehicle. In general, estimation accuracy of the vehicle position obtained through the dead reckoning is susceptible to a satellite reception condition such as multipath, and an error of about 10 m occurs depending on the reception condition. Therefore, even when the detailed shape of each lane is already known, it is less likely that an actual travel lane and a relative position of the vehicle in the lateral direction in the lane can be accurately estimated based on a comparison of the result of the dead reckoning with the detailed shape of each lane.

As described above, it is difficult to obtain the lateral position of the vehicle necessary for the estimation of the travel lane only from the vehicle position calculated through the dead reckoning in which the GNSS coordinate information, the vehicle speed signal information, and the angular velocity information are used together. In response to this, a technology of identifying the vehicle position through concurrent use of a result of analyzing image information captured by an on-vehicle camera has been developed. The analysis on the image information captured by the on-vehicle camera makes it possible to detect a painted line that is a line painted on a road, corresponding to each of left and right dividing lines of the travel lane. Hereinafter, among the dividing lines that define lanes of the road, a dividing line adjacent to the left side of the vehicle, that is, a line indicating a boundary between the travel lane and a lane located immediately on the left side of the travel lane is referred to as a left dividing line. Further, a dividing line adjacent to the right side of the vehicle, that is, a line indicating a boundary between the travel lane and a lane located immediately on the right side of the travel lane is referred to as a right dividing line. A color and shape applied to the dividing line vary from country to country or region to region. For example, in Japan, white and yellow are often used as the colors of the dividing line.

The vehicle position estimation system enables highly-accurate estimation of the vehicle position in the lane based on the relative position of the painted line with respect to the vehicle and the absolute position of the dividing line contained in the map information. Accuracy in position of a painted line recognized by a camera is generally on the order of several tens of centimeters, and therefore accuracy in lateral position of a vehicle on the order of tens of centimeters can also be expected.

The above-described painted line recognition technology using a camera has been increasingly applied to various driver assistance functions, and a general-purpose camera that has a painted line recognition capability and is designed to be used in an advanced driver assistance system (ADAS) has been made into a product. The painted line recognition capability of such a camera is generally based on a specification in which two painted lines immediately adjacent to the vehicle, that is, painted lines immediately adjacent to the left and right sides of the vehicle are detected, and then the two painted lines thus detected are represented with a polynomial, that is, a curved line, in an orthogonal coordinate system based on the position and the traveling direction of the vehicle and then output. It is presumed that the specification in which two painted lines are output is intended to apply the painted line recognition capability of the camera to a lane-keeping capability.

Accuracy in the painted line recognition using the camera varies depending on a travel condition around an own vehicle. Originally, it is expected that both the left dividing line and the right dividing line are detected, but a case where only one dividing line is recognized due to, for example, a difference in contrast on the road caused by a road structure, insufficient illuminance in a tunnel, a painted line hidden by a vehicle traveling in parallel, blurring of the painted line, or the like often occurs.

To cope with such uncertainty in painted line recognition using a camera, disclosed is a technology of estimating a traveling direction of a vehicle by performing correction based on a transition pattern of a line type predicted in advance for a line type of a detected painted line and a time-series data of the line type thus detected (for example, refer to Patent Document 1). Examples of the line type of the painted line include a branch line, a solid line, and a dashed line. The branch line is larger in width and shorter in length of dashed lines than a typical dividing line located between lanes. Examples of the traveling direction of the vehicle include a branch direction and a main line direction.

In Patent Document 1, when the branch line is found in front of the vehicle based on map data, a camera image obtained through taking an area in front of the vehicle is divided into three areas in the lateral direction, and painted line detection is performed on each of the areas. Then, the line type of the painted line thus detected is corrected based on a comparison of a result of the painted line detection on each of the areas with a transition pattern of the line type, predicted in advance, in each of the areas.

PRIOR ART DOCUMENTS

Patent Documents

Patent Document 1: Japanese Patent Application Laid-Open No. 2008-102684

SUMMARY

Problem to be Solved by the Invention

In Patent Document 1, it is assumed that the result of the painted line detection in each of the areas that result from dividing the camera image into three areas in the lateral direction is used. That is, in Patent Document 1, up to three painted lines need to be recognized. Therefore, the use of only two painted lines immediately adjacent to the vehicle based on the standard output specification of the result of the painted line recognition that is applied to the above-described driver assistance function is not possible. Further, in Patent Document 1, it is necessary to use a dedicated painted line recognition module capable of recognizing three painted lines, and thus it is difficult to apply such a module to a wide range of products.

Furthermore, in Patent Document 1, a correction target is only the line type of the painted line detected by the camera, and no description has been given of the detection position of the painted line or the presence or absence of the painted line. Therefore, applying Patent Document 1 directly to the vehicle position estimation technology does not contribute to an increase in accuracy of the vehicle position.

The present invention has been made to solve such problems, and an object of the present invention is to provide a vehicle position estimation apparatus capable of estimating a vehicle position with high accuracy.

Means to Solve the Problem

In order to solve the above problems, a vehicle position estimation apparatus according to the present invention includes an image information acquiring unit configured to acquire image information obtained through taking an image of a road in front of a vehicle, a painted line recognizing unit configured to recognize relative positions of left and right painted lines with respect to the vehicle based on the image information acquired by the image information acquiring unit, the left and right painted lines being painted on the road, a painted line recognition result processing unit configured to calculate whether the vehicle has made a lane change and a direction of the lane change when the vehicle has made the lane change, the relative positions of the left and right sides recognized by the painted line recognizing unit being positions of left and right dividing lines defining a lane of the road, a map information acquiring unit configured to acquire map information containing at least a lane connection relation that is a connection relation of the lane in an extending direction of the road, a vehicle lateral position calculating unit configured to calculate a lane where the vehicle is in travel and a vehicle lateral position that is a lateral position of the vehicle in the lane based on whether the vehicle has made the lane change and the direction of the lane change calculated by the painted line recognition result processing unit, and the lane connection relation acquired by the map information acquiring unit, a vehicle forward travel distance calculating unit configured to calculate a forward travel distance that is a distance by which the vehicle has traveled forward, and an on-map vehicle position calculating unit configured to calculate an on-map position of the vehicle on the road based on the map information acquired by the map information acquiring unit, the lane where the vehicle is in travel and the vehicle lateral position calculated by the vehicle lateral position calculating unit, and the forward travel distance calculated by the vehicle forward travel distance calculating unit.

Effects of the Invention

According to the present invention, since the vehicle position estimation apparatus includes the image information acquiring unit configured to acquire image information obtained through taking an image of a road in front of a vehicle, the painted line recognizing unit configured to recognize relative positions of left and right painted lines with respect to the vehicle based on the image information acquired by the image information acquiring unit, the left and right painted lines being painted on the road, the painted line recognition result processing unit configured to calculate whether the vehicle has made a lane change and a direction of the lane change when the vehicle has made the lane change, the relative positions of the left and right sides recognized by the painted line recognizing unit being positions of left and right dividing lines defining a lane of the road, the map information acquiring unit configured to acquire map information containing at least a lane connection relation that is a connection relation of the lane in an extending direction of the road, the vehicle lateral position calculating unit configured to calculate a lane where the vehicle is in travel and a vehicle lateral position that is a lateral position of the vehicle in the lane based on whether the vehicle has made the lane change and the direction of the lane change calculated by the painted line recognition result processing unit, and the lane connection relation acquired by the map information acquiring unit, the vehicle forward travel distance calculating unit configured to calculate a forward travel distance that is a distance by which the vehicle has traveled forward, and the on-map vehicle position calculating unit configured to calculate an on-map position of the vehicle on the road based on the map information acquired by the map information acquiring unit, the lane where the vehicle is in travel and the vehicle lateral position calculated by the vehicle lateral position calculating unit, and the forward travel distance calculated by the vehicle forward travel distance calculating unit, it is possible to estimate the vehicle position with high accuracy.

The objects, features, aspects, and advantages of the present invention will become more apparent from the following detailed description and the accompanying drawings.

DESCRIPTION OF EMBODIMENTS

Embodiments of the present invention will be described below with reference to the drawings.

First Embodiment

<Structure>

Figure 1:
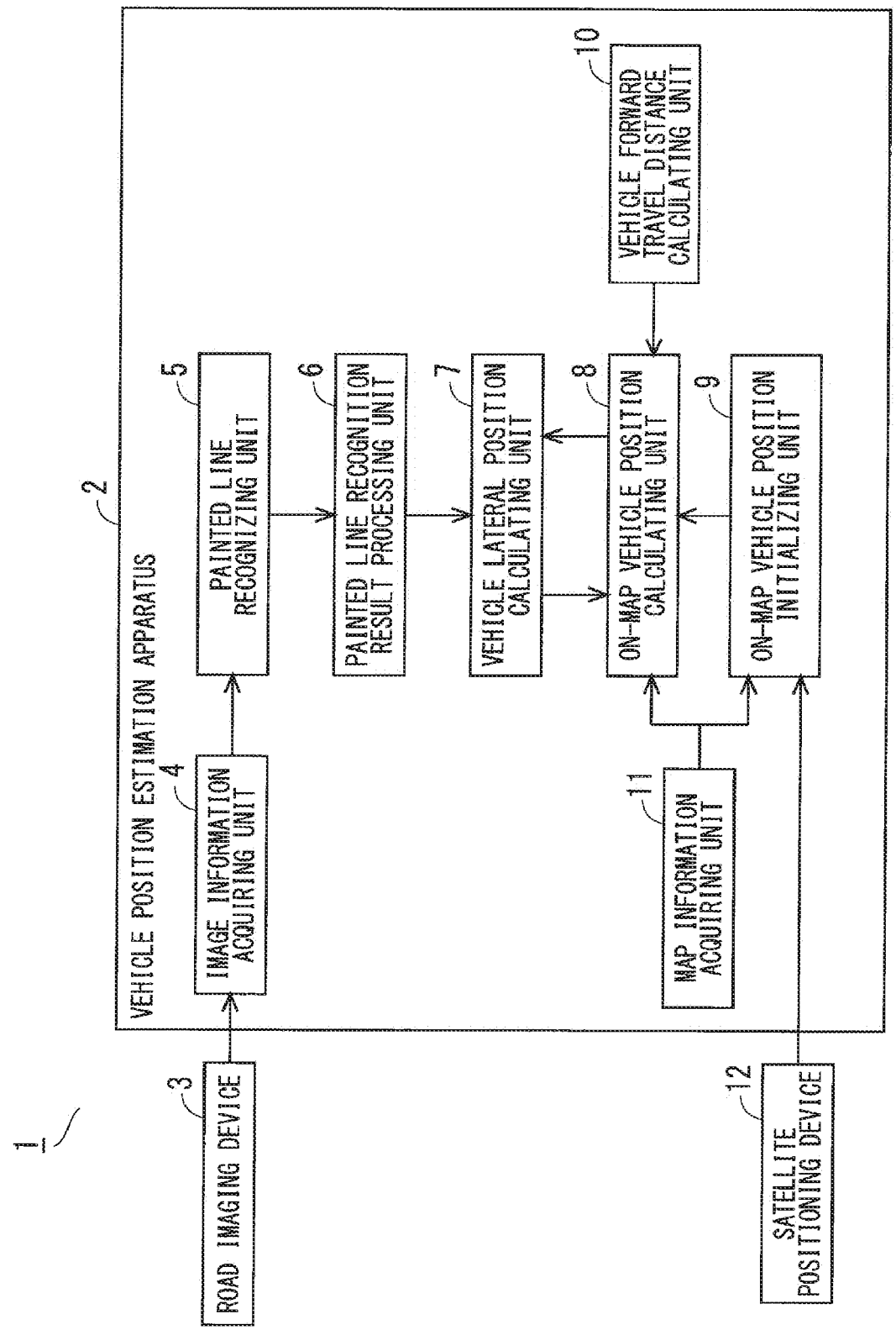
FIG. 1 is a block diagram showing an example of a structure of a vehicle position estimation system according to a first embodiment of the present invention.

FIG. 1 is a block diagram showing an example of a structure of a vehicle position estimation system 1 according to a first embodiment of the present invention. The vehicle position estimation system 1 estimates a vehicle position on a road where a mobile object such as a vehicle is in travel. A description will be given below on the assumption that the mobile object is a vehicle.

The vehicle position estimation system 1 includes a vehicle position estimation apparatus 2, a road imaging device 3, and a satellite positioning device 12. The vehicle position estimation apparatus 2 includes an image information acquiring unit 4, a painted line recognizing unit 5, a painted line recognition result processing unit 6, a vehicle lateral position calculating unit 7, an on-map vehicle position calculating unit 8, and an on-map vehicle position initializing unit 9, a vehicle forward travel distance calculating unit 10, and a map information acquiring unit 11.

The road imaging device 3 is, for example, a monocular camera or a stereo camera and is configured to be capable of taking an image of an area in front of the vehicle. The road imaging device 3 takes an image of an area in a traveling direction of the vehicle, that is, a painted line or a road sign located in front of the vehicle. The image information acquiring unit 4 acquires image information taken by the road imaging device 3.

The painted line recognizing unit 5 analyzes the image information acquired by the image information acquiring unit 4 to detect a painted line presumed to be a dividing line marking on a road. Further, the painted line recognizing unit 5 identifies, among painted lines thus detected, painted lines adjacent to the vehicle, more preferably painted lines adjacent to left and right sides of the vehicle and extending approximately parallel to the vehicle, and calculates relative positions of the painted lines with respect to the vehicle. That is, the painted line recognizing unit 5 recognizes the relative positions of the left and right painted lines with respect to the vehicle based on the image information acquired by the image information acquiring unit 4, the left and right painted lines being painted on the road.

The painted line recognition result processing unit 6 calculates whether the vehicle has made a lane change based on time-series changes in position of the two painted lines recognized by the painted line recognizing unit 5, and calculates, when the vehicle has made the lane change, a direction of the lane change. The painted line recognition result processing unit 6 further calculates positions of left and right dividing lines of a lane where the vehicle is in travel.

The vehicle forward travel distance calculating unit 10 calculates a forward travel distance of the vehicle based on a detection result such as a tire rotation speed or tire rotation angle when the vehicle travels forward.

The map information acquiring unit 11 is a hard disk drive (HDD), a memory card, or the like, and stores high-precision map information containing a detailed shape of each lane. In the high-precision map information, shapes of a lane center line and dividing lines of each lane are represented by a point sequence. Further, the high-precision map information contains a lane width at each point on the lane center line, and a lane connection relation that is a connection relation of the lane in an extending direction of the road. Note that the lane width may be calculated from the point sequence representing the shape of the dividing line. The map information acquiring unit 11 may be configured to acquire the high-precision map information from the outside as needed.

The vehicle lateral position calculating unit 7 calculates, based on a recognition result from the painted line recognition result processing unit 6 and the lane connection relation stored in the map information acquiring unit 11, a vehicle lateral position that is a lateral position of the vehicle in a lane where the vehicle is in travel.

The on-map vehicle position calculating unit 8 updates, upon being notified of the vehicle lateral position from the vehicle lateral position calculating unit 7, an on-map vehicle lateral position, and updates, upon being notified of the forward travel distance of the vehicle from the vehicle forward travel distance calculating unit 10, an on-map position of the vehicle in a front-to-back direction. The position of the vehicle in the front-to-back direction is a position along the traveling direction of the vehicle, and is also referred to as a vehicle longitudinal position.

The satellite positioning device 12 is connected with a GNSS antenna for receiving radio waves from satellites, and measures the current position of the vehicle including latitude and longitude based on the radio waves from the satellites. The on-map vehicle position initializing unit 9 notifies the on-map vehicle position calculating unit 8 of the current position measured by the satellite positioning device 12 in order to localize the vehicle on the map for the first time. Note that a description has been given based on FIG. 1 in which the satellite positioning device 12 is provided outside the vehicle position estimation apparatus 2; however, the present invention is not limited to such a structure. For example, the satellite positioning device 12 may be provided inside the vehicle position estimation apparatus 2.

<Operation>

<Operation of Painted Line Recognizing Unit 5>

The painted line recognizing unit 5 detects, from an image representing an area in front of the vehicle acquired by the image information acquiring unit 4, a plurality of painted lines presumed to be dividing line markings on the road. Then, the painted line recognizing unit 5 identifies, among the plurality of painted lines thus detected, two painted lines presumed to be dividing lines immediately adjacent to the left and right sides of the vehicle, and calculates a relative position relation between each of the two painted lines and the vehicle.

Figure 2:
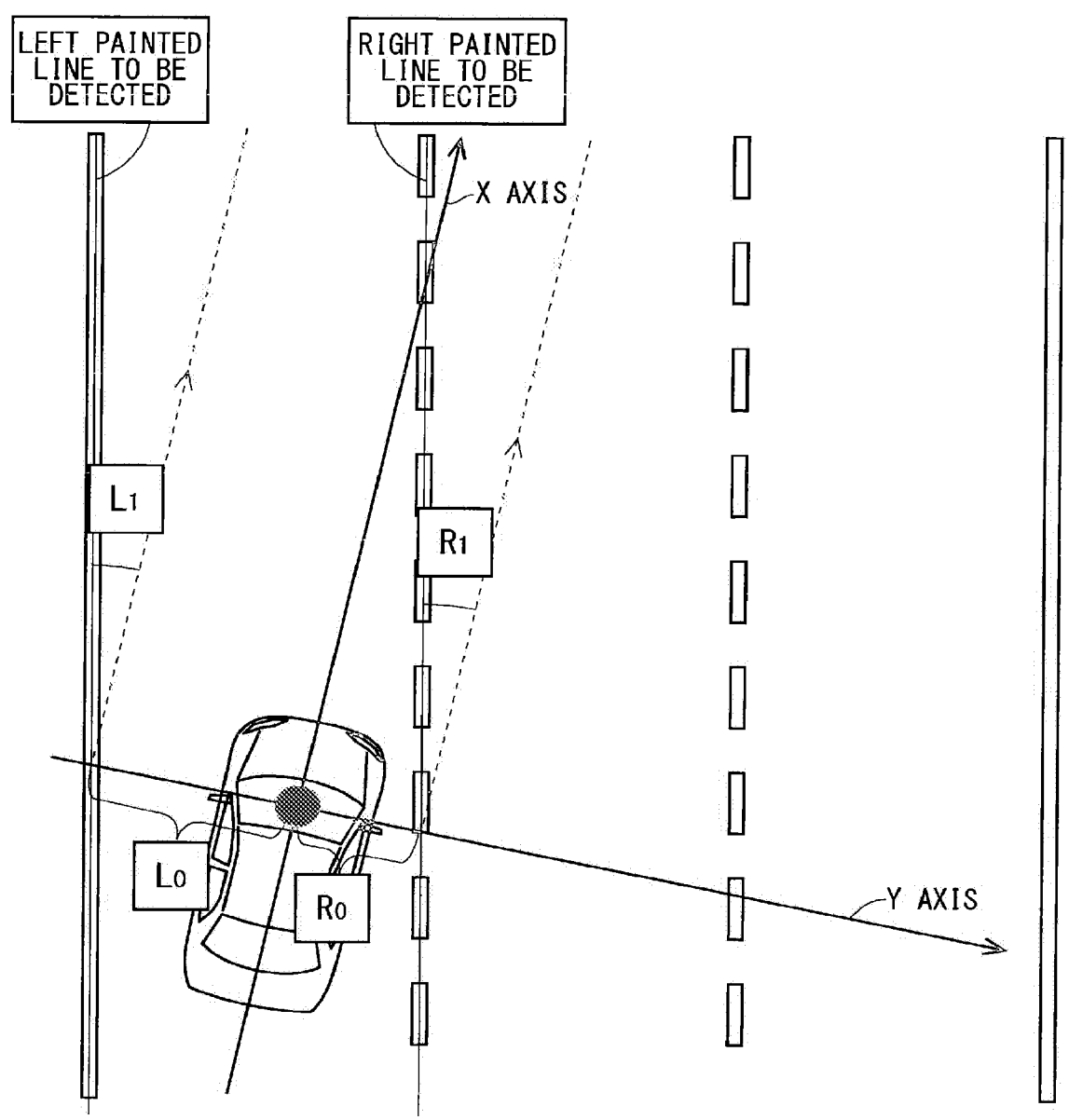
FIG. 2 is a diagram for describing an operation of a painted line recognizing unit according to the first embodiment of the present invention.

Specifically, as shown in FIG. 2, the painted line recognizing unit 5 represents shapes of the two painted lines with a one- or more-dimensional polynomial in a two-dimensional orthogonal coordinate system where the vehicle position is an origin, a forward direction of the vehicle is an X-axis direction, and a right direction of the vehicle is a y-axis direction. That is, the two painted lines are respectively represented by the following Equations (1), (2).

$$y = L_0 + L_1 \cdot x + f_L(x) \quad (1)$$

$$y = R_0 + R_1 \cdot x + f_R(x) \quad (2)$$

In Equations (1), (2), $f_L(x)$ and $f_R(x)$ each denote a two- or more-dimensional polynomial and are used as error terms in the present embodiment. Further, lateral positions of the two painted lines relative to the vehicle are each denoted by $L_0$ and $R_0$, and inclinations of the two painted lines to the traveling direction of the vehicle are each denoted by $L_1$ and $R_1$. Hereinafter, $L_0$ denotes a lateral position of a left painted line, $R_0$ denotes a lateral position of a right painted line, $L_1$ denotes an inclination of the left painted line, and $R_1$ denotes an inclination of the right painted line. Note that although the origin is the vehicle position, the origin is specifically a position where the road imaging device 3 is installed.

<Operation of Painted Line Recognition Result Processing Unit 6>

The painted line recognition result processing unit 6 calculates whether the vehicle has made a lane change based on the lateral positions of the two painted lines calculated by the painted line recognizing unit 5 and calculates, when the vehicle has made the lane change, a direction of the lane change. Whether a lane change has been made is denoted by "No", "Yes", and "Indefinite". "No" denotes that no lane change has been made. "Yes" denotes that a lane change has been made. "Indefinite" denotes that it has failed to determine whether a lane change has been made based on the lateral positions of the two painted lines calculated by the painted line recognizing unit 5.

Next, a description will be given of the calculation of whether a lane change has been made and the direction of the lane change.

Positions of the left painted line and the right painted line at a current time (t) calculated by the painted line recognizing unit 5 are represented by the following Equations (3), (4), respectively, and positions of the left painted line and the right painted line at a previous time (t-1) are represented by the following Equations (5), (6), respectively.

$$y = L_{0,t} + L_{1,t} \cdot x + f_{L,t}(x) \quad (3)$$

$$y = R_{0,t} + R_{1,t} \cdot x + f_{R,t}(x) \quad (4)$$

$$y = L_{0,t-1} + L_{1,t-1} \cdot x + f_{L,t-1}(x) \quad (5)$$

$$y = R_{0,t-1} + R_{1,t-1} \cdot x + f_{R,t-1}(x) \quad (6)$$

In Equations (3) to (6), $L_{0,t}$ denotes the lateral position of the left painted line at a time t calculated by the painted line recognizing unit 5, and $R_{0,t}$ denotes the lateral position of the right painted line at the time t calculated by the painted line recognizing unit 5. $L_{1,t}$ denotes the inclination of the left painted line at the time t calculated by the painted line recognizing unit 5, and $R_{1,t}$ denotes the inclination of the right painted line at the time t calculated by the painted line recognizing unit 5. Further, $f_{L,t}(x)$ and $f_{R,t}(x)$ denote a two- or more-dimensional polynomial of the left painted line at the time t calculated by the painted line recognizing unit 5 and a two- or more-dimensional polynomial of the right painted line at the time t calculated by the painted line recognizing unit 5, respectively, and are used as error terms in the present embodiment.

Figure 3:
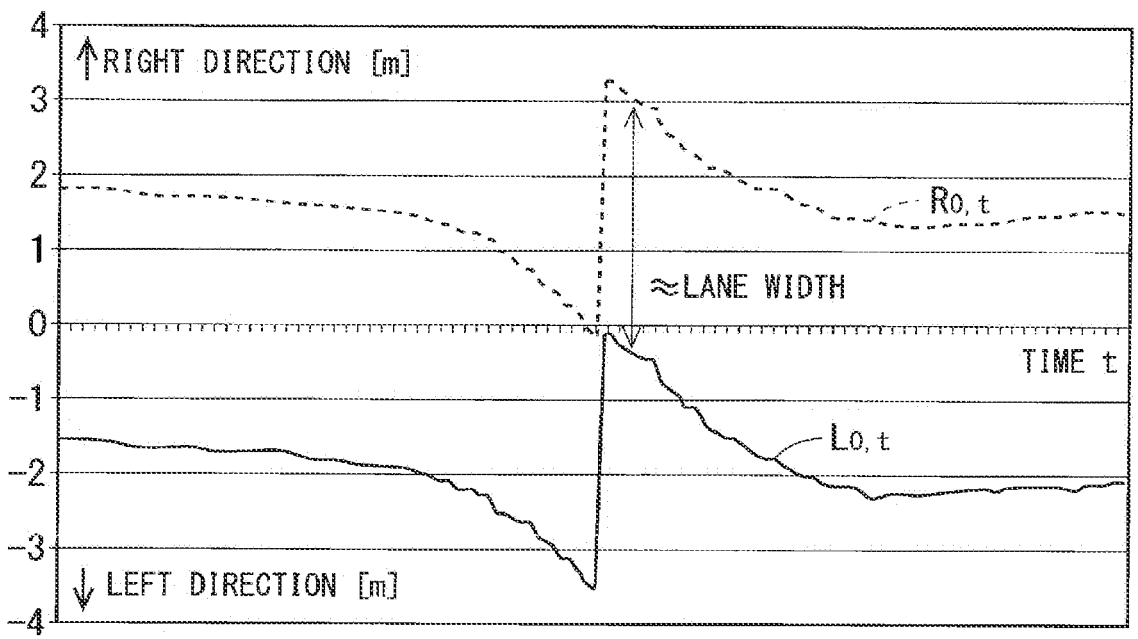
FIG. 3 is a diagram showing time-series data of positions of painted lines recognized by the painted line recognizing unit according to the first embodiment of the present invention.

For example, when both of the following Inequalities (7), (8) are satisfied, it can be read that both the left painted line and the right painted line have moved rightward by a distance equivalent to one lane as shown in FIG. 3. This causes the painted line recognition result processing unit 6 to determine that a lane change to the right lane has been made, causing whether a lane change has been made to be "Yes" and a direction of the lane change to be "right".

$$(L_{0,t} - L_{0,t-1}) > \theta_{Lchange} * Wid_t \quad (7)$$

$$(R_{0,t} - R_{0,t-1}) > \theta_{Lchange} * Wid_t \quad (8)$$

In Inequalities (7), (8), $Wid_t$ denotes the lane width that may be a width of a lane in the vicinity of the current point acquired from the map information acquiring unit 11 or may be calculated from the following Equation (9) that takes into consideration a difference between the lane width taken by the camera and the actual lane width. Further, $\theta_{Lchange}$ denotes a parameter for allowing an error in the lane width, and is preferably set smaller than 1 and close to 1, for example, 0.7.

$$Wid_t = (R^{(D)}_{0,t-1} - L^{(D)}_{0,t-1}) * (W_{Map,t} / W_{Map,t-1}) \quad (9)$$

In Equation (9), $W_{Map,t}$ denotes a lane width of a lane where the vehicle is in travel acquired from the map information acquiring unit 11 at the current time (t), and $W_{Map,t-1}$ denotes a lane width of a lane where the vehicle is in travel acquired from the map information acquiring unit 11 at the previous time (t−1).

Figure 4:
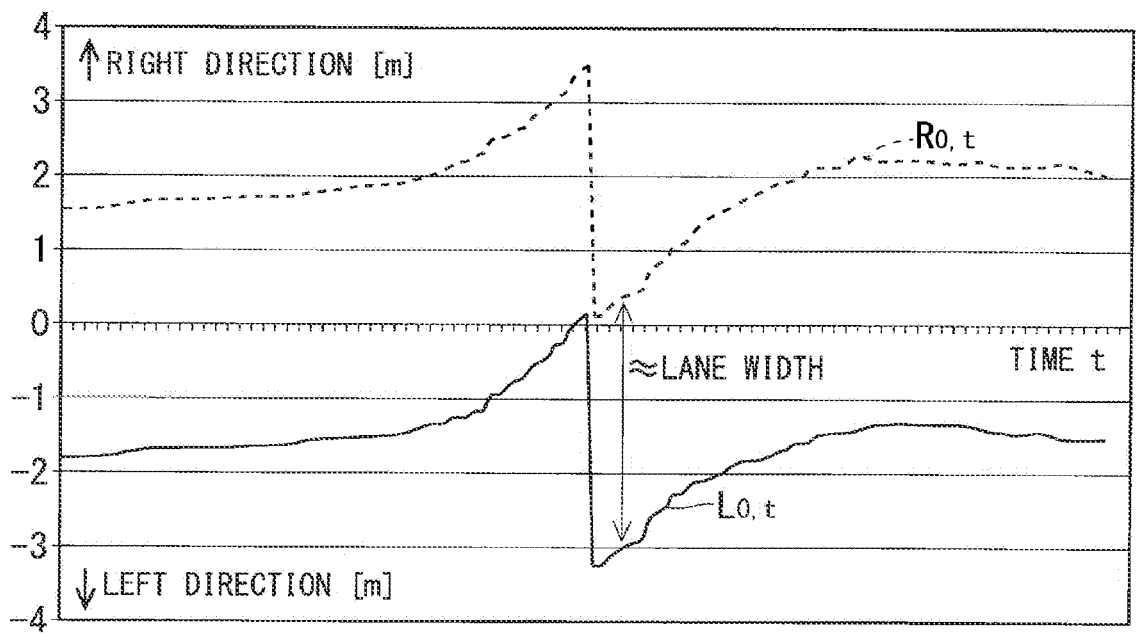
FIG. 4 is a diagram showing the time-series data of the positions of the painted lines recognized by the painted line recognizing unit according to the first embodiment of the present invention.

Similarly, when both of the following Inequalities (10), (11) are satisfied, it can be read that both the left painted line and the right painted line have moved leftward by a distance equivalent to one lane as shown in FIG. 4. This causes the painted line recognition result processing unit 6 to determine that a lane change to the left lane has been made, causing whether a lane change has been made to be "Yes" and a direction of the lane change to be "left".

$$(L_{0,t} - L_{0,t-1}) < \theta_{Lchange} * Wid_t \quad (10)$$

$$(R_{0,t} - R_{0,t-1}) < \theta_{Lchange} * Wid_t \quad (11)$$

When it has failed to determine whether a lane change has been made, whether a lane change has been made is determined as "Indefinite". Specific examples of a case where it has failed to determine whether a lane change has been made include (A) a case where the painted line recognizing unit 5 has failed to recognize one or both of the two painted lines and (B) a case where a change in the left painted line and a change in the right painted line are not synchronized. A determination criterion for the case of (B) may be, for example, a case where both of the following Inequalities (12), (13) are satisfied.

$$((L_{0,t}-L_{0,t-1})-\theta_{Lchange}*Wid_t)*((R_{0,t}-R_{0,t-1})-\theta_{Lchange}*Wid_t)<0 \quad (12)$$

$$((L_{0,t}-L_{0,t-1})+\theta_{Lchange}*Wid_t)*((R_{0,t}-R_{0,t-1})+\theta Lchange*Wid_t)<0 \quad (13)$$

A lateral position of a left dividing line corresponds to the lateral position $L_{0,t}$ of the left painted line recognized by the painted line recognizing unit 5 at the current time (t), and a lateral position of a right dividing line corresponds to the lateral position $R_{0,t}$ of the right painted line recognized by the painted line recognizing unit 5 at the current time (t).

<Operation of Vehicle Lateral Position Calculating Unit 7>

Figure 5:
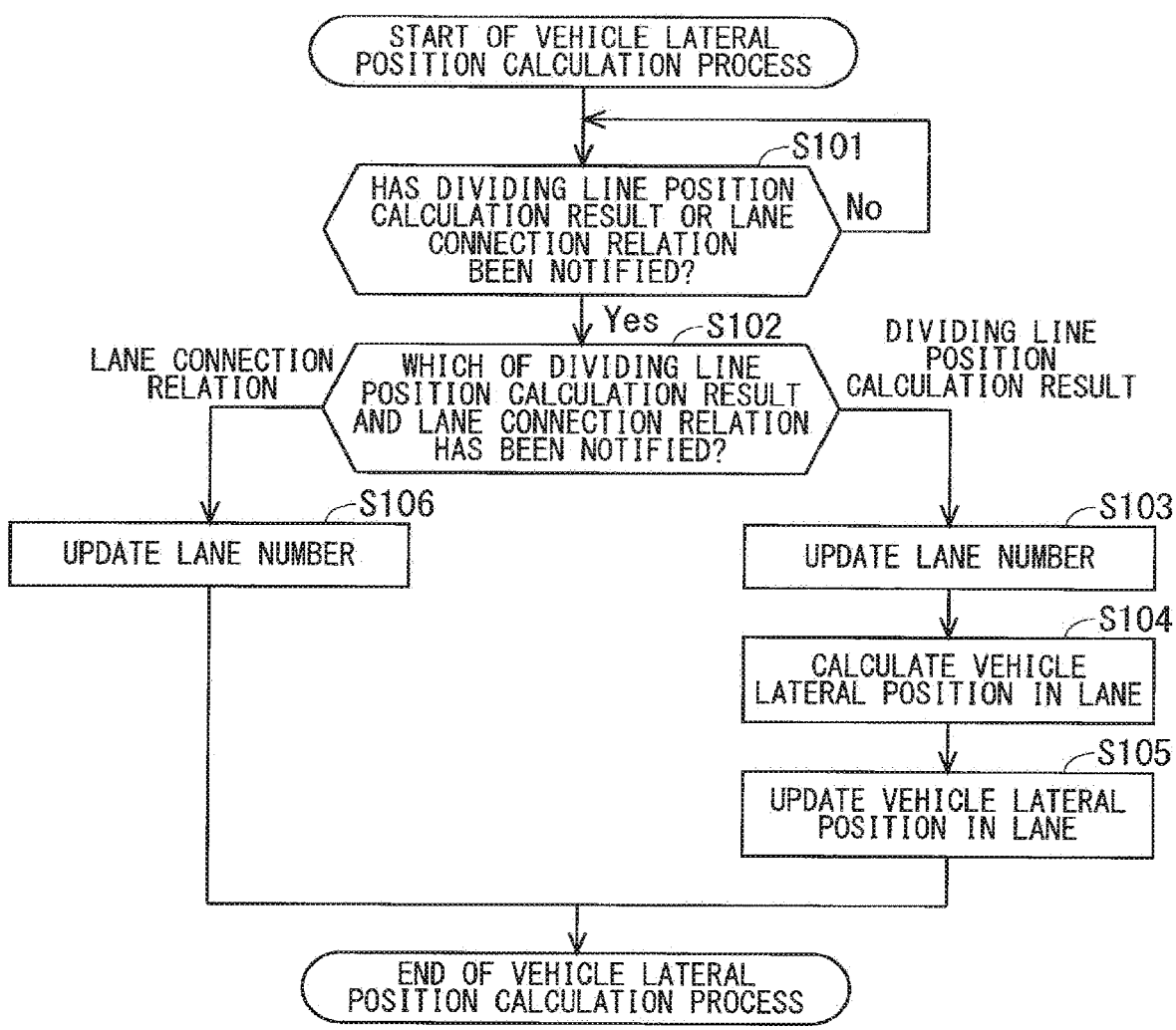
FIG. 5 is a flow chart showing an example of an operation of a vehicle lateral position calculating unit according to the first embodiment of the present invention.

FIG. 5 is a flowchart showing an example of the operation of the vehicle lateral position calculating unit 7.

In step S101, the vehicle lateral position calculating unit 7 waits until being notified of a dividing line position calculation result from the painted line recognition result processing unit 6 or the lane connection relation from the on-map vehicle position calculating unit 8, and proceeds to step S102 upon being notified of either the dividing line position calculation result or the lane connection relation.

In step S102, the vehicle lateral position calculating unit 7 determines which of the dividing line position calculation result and the lane connection relation has been notified. When the dividing line position calculation result is notified, the vehicle lateral position calculating unit 7 proceeds to step S103. On the other hand, when the lane connection relation is notified, the vehicle lateral position calculating unit 7 proceeds to step S106.

In step S103, when the dividing line position calculation result notified from the painted line recognition result processing unit 6 indicates that whether a lane change has been made is "Yes", the vehicle lateral position calculating unit 7 increments or decrements a lane number held therein by 1. When the dividing line position calculation result indicates that whether a lane change has been made is either "No" or "Indefinite", the vehicle lateral position calculating unit 7 makes the lane number identical to a lane number at the previous time.

For example, when the travel lane number is 2 immediately before the dividing line position calculation result is notified, and the dividing line position calculation result thus notified indicates that whether a lane change has been made is "Yes" and a direction of the lane change is "left", the travel lane number is updated to 1. The travel lane number of 1 indicates that the vehicle is in travel in a first lane of the road. The travel lane number of 2 indicates that the vehicle is in travel in a second lane of the road.

In step S104, the vehicle lateral position calculating unit 7 calculates the vehicle lateral position in a lane from the position of the left dividing line and the position of the right dividing line notified from the painted line recognition result processing unit 6. In step S105, the vehicle lateral position calculating unit 7 updates a vehicle lateral position held therein to the vehicle lateral position calculated in step S104.

Specifically, for example, the vehicle lateral position $Y_{car}$ in the lane is calculated from the following Equation (14).

$$Y_{car}=(-L^{(D)}_{0,t})/(R^{(D)}_{0,t-1}-L^{(D)}_{0,t-1}) \quad (14)$$

In Equation (14), $L^{(D)}_{0,t}$ denotes the lateral position of the left dividing line at the time (t) determined by the painted line recognition result processing unit 6, and $R^{(D)}_{0,t}$ denotes the lateral position of the right dividing line at the time (t) determined by the painted line recognition result processing unit 6. Further, $Y_{car}=0$ denotes that the vehicle travels on the left painted line, $Y_{car}=1$ denotes that the vehicle travels on the right painted line, and $Y_{car}=0.5$ denotes that the vehicle travels on a center of the lane.

In step 106, the vehicle lateral position calculating unit 7 updates the lane number based on the lane connection relation notified from the on-map vehicle position calculating unit 8. The lane connection relation thus notified contains a connection relation between a lane configuration at the previous travel point and a lane configuration at the current travel point.

Figure 7:
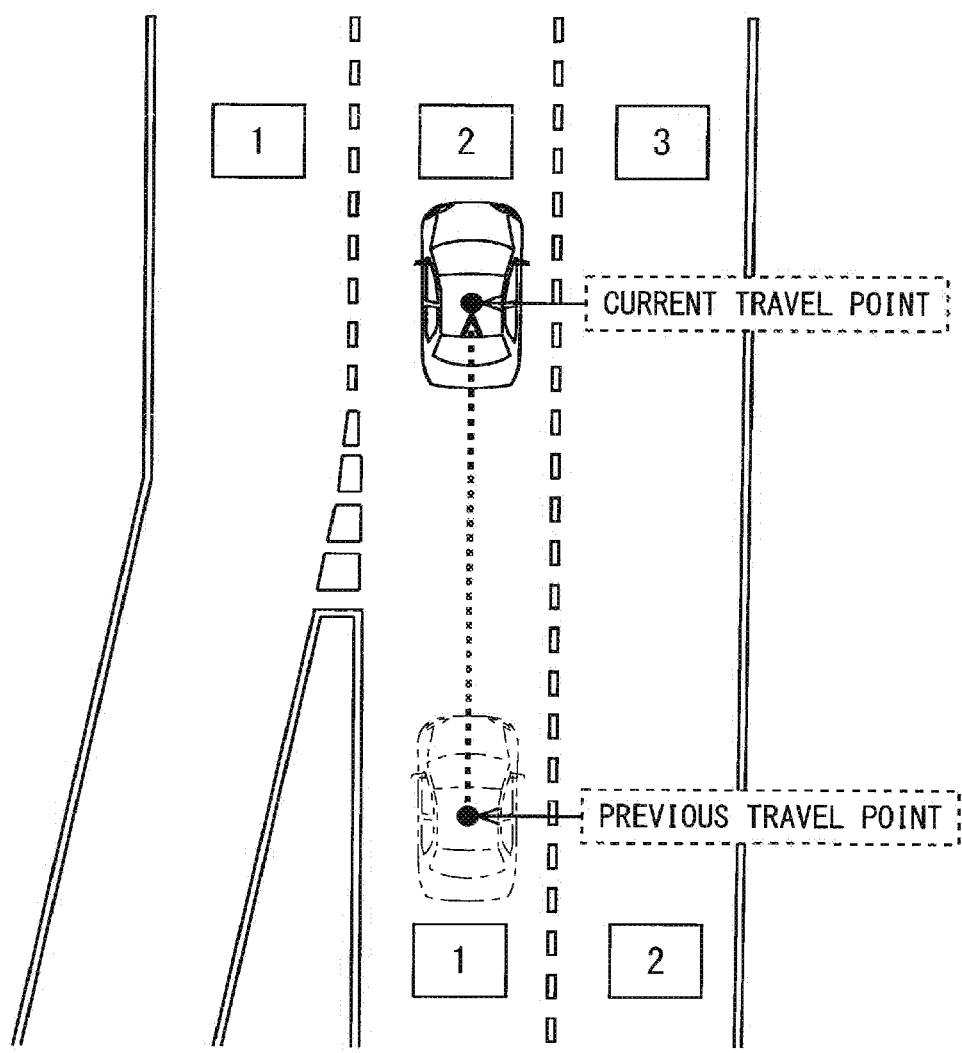
FIG. 7 is a diagram showing an example of a lane connection relation according to the first embodiment of the present invention.
Figures 8, 9:
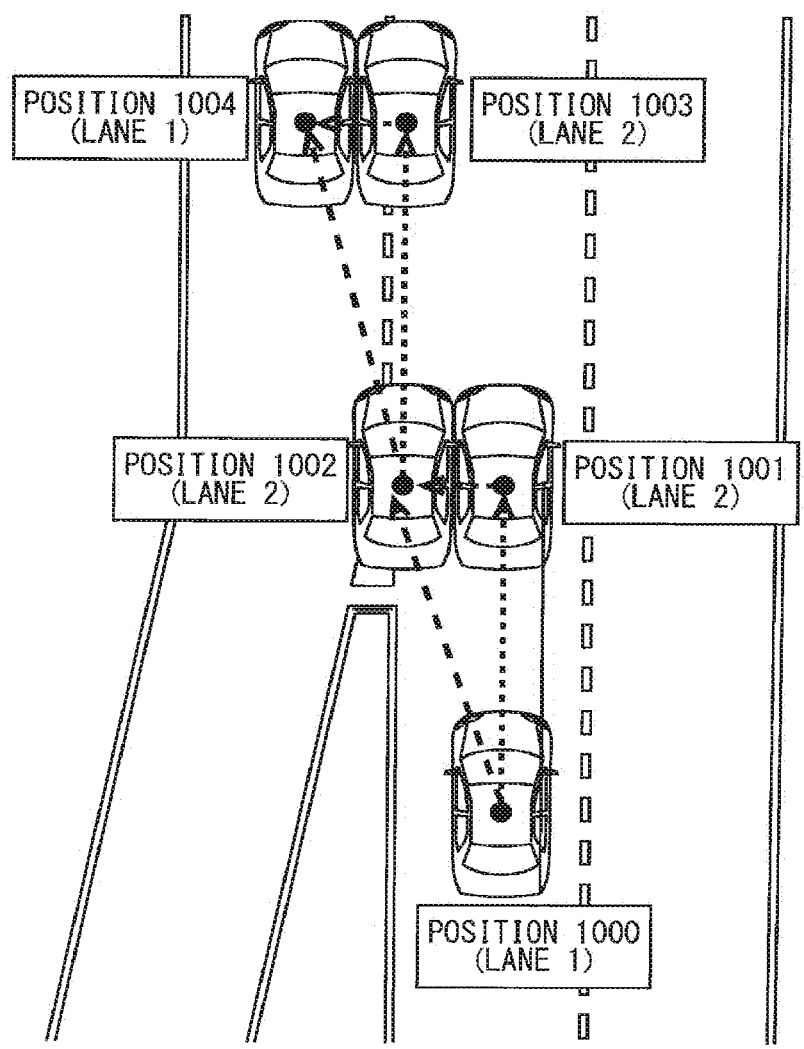
FIG. 8 is a diagram showing an example of the lane connection relation according to the first embodiment of the present invention.
FIG. 9 is a diagram for describing an operation of a vehicle position estimation apparatus according to the first embodiment of the present invention.

FIGS. 7 and 8 show an example of the lane connection relation. In the example of FIG. 7, the first travel lane at the previous travel point is connected to the second travel lane at the current travel point. The second travel lane at the previous travel point is connected to the third travel lane at the current travel point. FIG. 8 shows correspondence relations of the above connections. For example, when the lane connection relation shown in FIGS. 7 and 8 is notified in a case where the previous travel lane number is 1, the travel lane number is updated to 2.

<Operation of On-Map Vehicle Position Calculating Unit 8>

Figure 6:
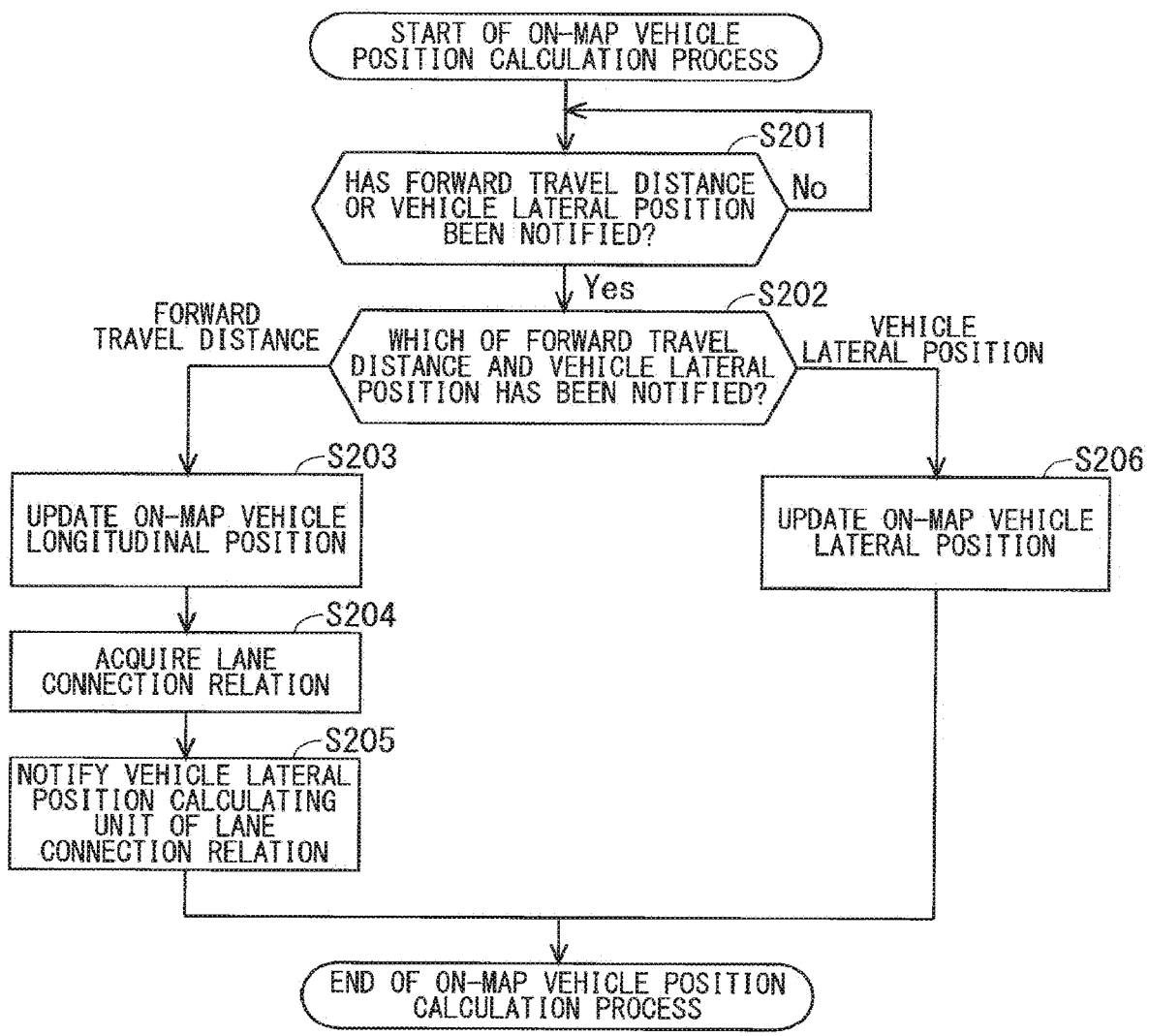
FIG. 6 is a flowchart showing an example of an operation of an on-map vehicle position calculating unit according to the first embodiment of the present invention.

FIG. 6 is a flowchart showing an example of the operation of the on-map vehicle position calculating unit 8.

In step S201, the on-map vehicle position calculating unit 8 waits until being notified of the forward travel distance from the vehicle forward travel distance calculating unit 10 or the vehicle lateral position from the vehicle lateral position calculating unit 7, and proceeds to step S202 upon being notified of either the forward travel distance or the vehicle lateral position.

In step S202, the on-map vehicle position calculating unit 8 determines which of the forward travel distance and the vehicle lateral position has been notified. When the forward travel distance is notified, the on-map vehicle position calculating unit 8 proceeds to step S203. On the other hand, when the vehicle lateral position is notified, the on-map vehicle position calculating unit 8 proceeds to step S206.

In step S203, the on-map vehicle position calculating unit 8 moves the vehicle position forward with the vehicle lateral position unchanged, and updates an on-map vehicle position held therein to the vehicle position thus moved forward.

In step S204, the on-map vehicle position calculating unit 8 acquires, from the map information acquiring unit 11, the lane connection relations at the vehicle positions before and after the forward movement. Then, in step S205, the on-map vehicle position calculating unit 8 notifies the vehicle lateral position calculating unit 7 of the lane connection relations acquired from the map information acquiring unit 11.

In step S206, the on-map vehicle position calculating unit 8 moves the vehicle position in the lateral direction within the road so as to make the vehicle position identical to the vehicle lateral position thus notified with the vehicle longitudinal position unchanged and updates an on-map vehicle position held therein to the vehicle position thus moved in the lateral direction.

From the above, the on-map vehicle position calculating unit 8 add up the forward travel distances acquired from the vehicle forward travel distance calculating unit 10 to the initial position given from the on-map vehicle position initializing unit 9 to calculate the current on-map vehicle longitudinal position. Further, the on-map vehicle position calculating unit 8 identifies the current on-map vehicle lateral position based on the vehicle lateral position acquired from the vehicle lateral position calculating unit 7. Note that when the vehicle reaches a branch point, the traveling direction of the vehicle is identified based on a lane where the vehicle is in travel and the position in the lane.

<Operation of On-Map Vehicle Position Initializing Unit 9>

The on-map vehicle position initializing unit 9 notifies the on-map vehicle position calculating unit 8 of absolute coordinates serving as a base when the vehicle starts to travel. For example, when satellite positioning becomes available immediately after the vehicle starts to travel, the on-map vehicle position initializing unit 9 may notify the on-map vehicle position calculating unit 8 of a satellite positioning result acquired from the satellite positioning device 12 only once.

Note that, when the dividing line position calculation result notified from the painted line recognition result processing unit 6 indicates that whether a lane change has been made is "Indefinite", what kind of lane change has been made is unknown while whether a lane change has been made remains "Indefinite", preventing the subsequent travel lane from being identified. Such a case also requires that the vehicle position be identified by the on-map vehicle position initializing unit 9, that is, the vehicle position be initialized again.

Therefore, not only immediately after the vehicle starts to travel, but whenever whether a lane change has been made is "Indefinite" or the on-map vehicle position calculated by the on-map vehicle position calculating unit 8 is significantly different from the satellite positioning result obtained by the satellite positioning device 12, the on-map vehicle position initializing unit 9 preferably notifies the on-map vehicle position calculating unit 8 of the satellite positioning result obtained by the satellite positioning device 12.

Further, at a specific point where the vehicle position can be identified in a lane level such as a point where the vehicle enters an expressway or an installation point of an optical beacon, information on the position thus identified may be notified to the on-map vehicle position calculating unit 8.

<Overall Operation of Vehicle Position Estimation Apparatus 2>

A description will be given of the overall operation of the vehicle position estimation apparatus 2 with reference to FIG. 9. As a premise, it is assumed that the on-map vehicle position initializing unit 9 has already notified the on-map vehicle position calculating unit 8 of the information on a position 1000.

First, the on-map vehicle position calculating unit 8 acquires the forward travel distance from the vehicle forward travel distance calculating unit 10. A vehicle position that is a result of reflecting the forward travel distance thus acquired becomes a position 1001. Accordingly, the on-map vehicle position calculating unit 8 acquires the lane connection relation at the position 1001 from the map information acquiring unit 11, and notifies the vehicle lateral position calculating unit 7 of the lane connection relation thus acquired. In the example of FIG. 9, the lane connection relation contains information representing that another lane merging from the left side of the road causes the first lane before the merging to be the second lane at the position 1001 and causes the second lane before the merging to be the third lane at the position 1001. The vehicle lateral position calculating unit 7 switches the travel lane from the first lane to the second lane while maintaining the position in the lane.

Next, the painted line recognizing unit 5 performs painted line recognition, and the painted line recognition result processing unit 6 determines that whether a lane change has been made is "No". The vehicle lateral position calculating unit 7 notifies the on-map vehicle position calculating unit 8 of the vehicle lateral position calculated based on the dividing line position calculation result notified from the painted line recognition result processing unit 6. An on-map vehicle lateral position that is a result of recalculation made by the on-map vehicle position calculating unit 8 becomes a position 1002.

Next, the on-map vehicle position calculating unit 8 acquires the forward travel distance from the vehicle forward travel distance calculating unit 10. A vehicle position that is a result of reflecting the forward travel distance thus acquired becomes a position 1003. Further, the on-map vehicle position calculating unit 8 acquires the lane connection relation at the position 1003 from the map information acquiring unit 11 and notifies the vehicle lateral position calculating unit 7 of the lane connection relation thus acquired.

Next, the painted line recognizing unit 5 performs painted line recognition, and the painted line recognition result processing unit 6 determines that whether a lane change has been made is "Yes" based on confirmation of the fact that the vehicle has crossed the left painted line. The vehicle lateral position calculating unit 7 changes the vehicle lateral position to the first lane. The vehicle lateral position calculating unit 7 notifies the on-map vehicle position calculating unit 8 of the vehicle lateral position. An on-map vehicle lateral position that is a result of recalculation made by the on-map vehicle position calculating unit 8 becomes a position 1004.

<Effect>

In the first embodiment, the vehicle lateral position calculating unit 7 calculates the vehicle lateral position in a lane based on the lane change information and the dividing line detection position calculated by the painted line recognition result processing unit 6. On the other hand, the on-map vehicle position calculating unit 8 calculates the vehicle longitudinal position based on the forward travel distance acquired from the vehicle forward travel distance calculating unit 10. This makes it possible to estimate the vehicle lateral position and the vehicle longitudinal position in a lane without using satellite positioning while the vehicle is in travel. Further, the on-map vehicle position calculating unit 8 is capable of calculating the on-map vehicle position by taking into consideration the information of the lane connection relation in the vicinity of the branch point. Since the painted line position taken by the camera is used in the first embodiment, it is possible to prevent accumulation of direction errors that occurs in the dead reckoning and prevent a position deviated from a road from being indicated. Accordingly, it is possible to accurately calculate the vehicle position.

Second Embodiment

<Structure>

In the first embodiment, the use of the image taken by the camera and the forward travel distance calculated by the vehicle forward travel distance calculating unit 10 allows estimation of the vehicle position that allows a reduction in cumulative error. However, a lateral position error due to noise or a recognition error contained in the painted line recognition result from the painted line recognizing unit 5 still poses a problem. The second embodiment of the present invention solves such a problem.

Figure 10:
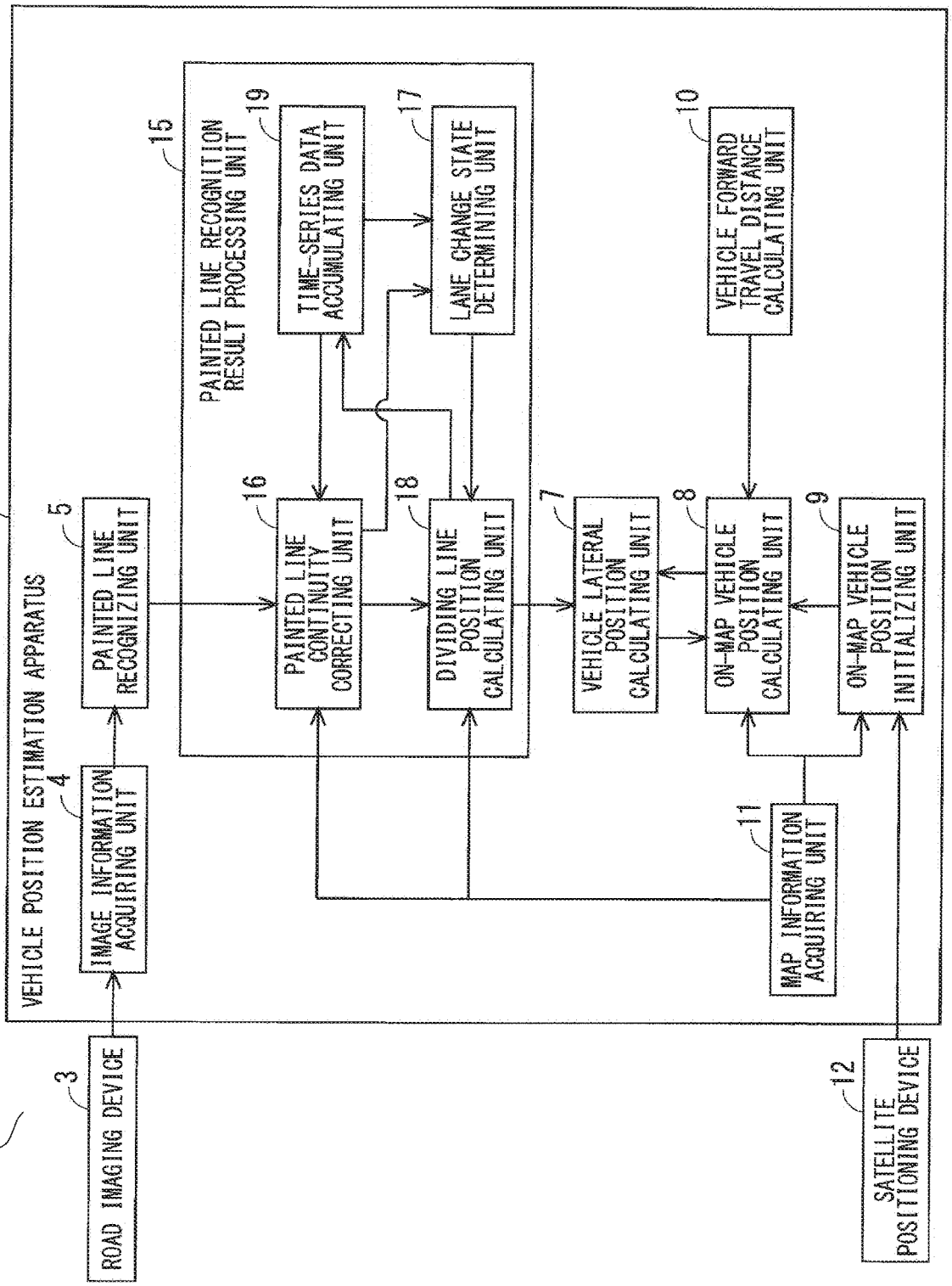
FIG. 10 is a block diagram showing an example of a structure of a vehicle position estimation system according to a second embodiment of the present invention.

FIG. 10 is a block diagram showing an example of a structure of a vehicle position estimation system 13 according to a second embodiment of the present invention. As shown in FIG. 10, a vehicle position estimation apparatus 14 according to the second embodiment includes a painted line recognition result processing unit 15. Other components and operations are identical to the equivalent components and operations of the first embodiment; thus, detailed descriptions of the other components and operations are omitted herein.

The painted line recognition result processing unit 15 includes a painted line continuity correcting unit 16, a lane change state determining unit 17, a dividing line position calculating unit 18, and a time-series data accumulating unit 19.

The painted line continuity correcting unit 16 corrects, based on the fact that the painted lines on a road surface are graphically continuous, the noise or the recognition error contained in the painted line recognition result from the painted line recognizing unit 5 using information accumulated in the time-series data accumulating unit 19 and outputs a continuous painted line recognition result. That is, the painted line continuity correcting unit 16 makes correction, based on relative positions of the left and right sides recognized by the painted line recognizing unit 5, to make the positions of the left and right painted lines temporally continuous.

The lane change state determining unit 17 determines a lane change state based on the correction result from the painted line continuity correcting unit 16 and the information accumulated in the time-series data accumulating unit 19. That is, the lane change state determining unit 17 determines the lane change state of the vehicle containing the direction of the lane change based on the relative positions of the left and right painted lines corrected by the painted line continuity correcting unit 16 and past positions of the left and right dividing lines. The lane change state includes "lane change started", "lane change in progress", "lane change completed", and "lane change interrupted".

The dividing line position calculating unit 18 determines the painted line position based on the correction result from the painted line continuity correcting unit 16 and the determination result of the lane change state determined by the lane change state determining unit 17 and calculates the position of the left dividing line and the position of the right dividing line of the lane where the vehicle is in travel. That is, the dividing line position calculating unit 18 calculates, based on the relative positions of the left and right painted lines corrected by the painted line continuity correcting unit 16 and the lane change state of the vehicle determined by the lane change state determining unit 17, the positions of the left and right dividing lines.

The time-series data accumulating unit 19 stores and accumulates the positions of the left and right dividing lines calculated by the dividing line position calculating unit 18 as time-series data. When data accumulated exceeds a buffer size, data in the buffer is erased in chronological order.

<Operation>
<Operation of Painted Line Continuity Correcting Unit 16>

Figure 11:
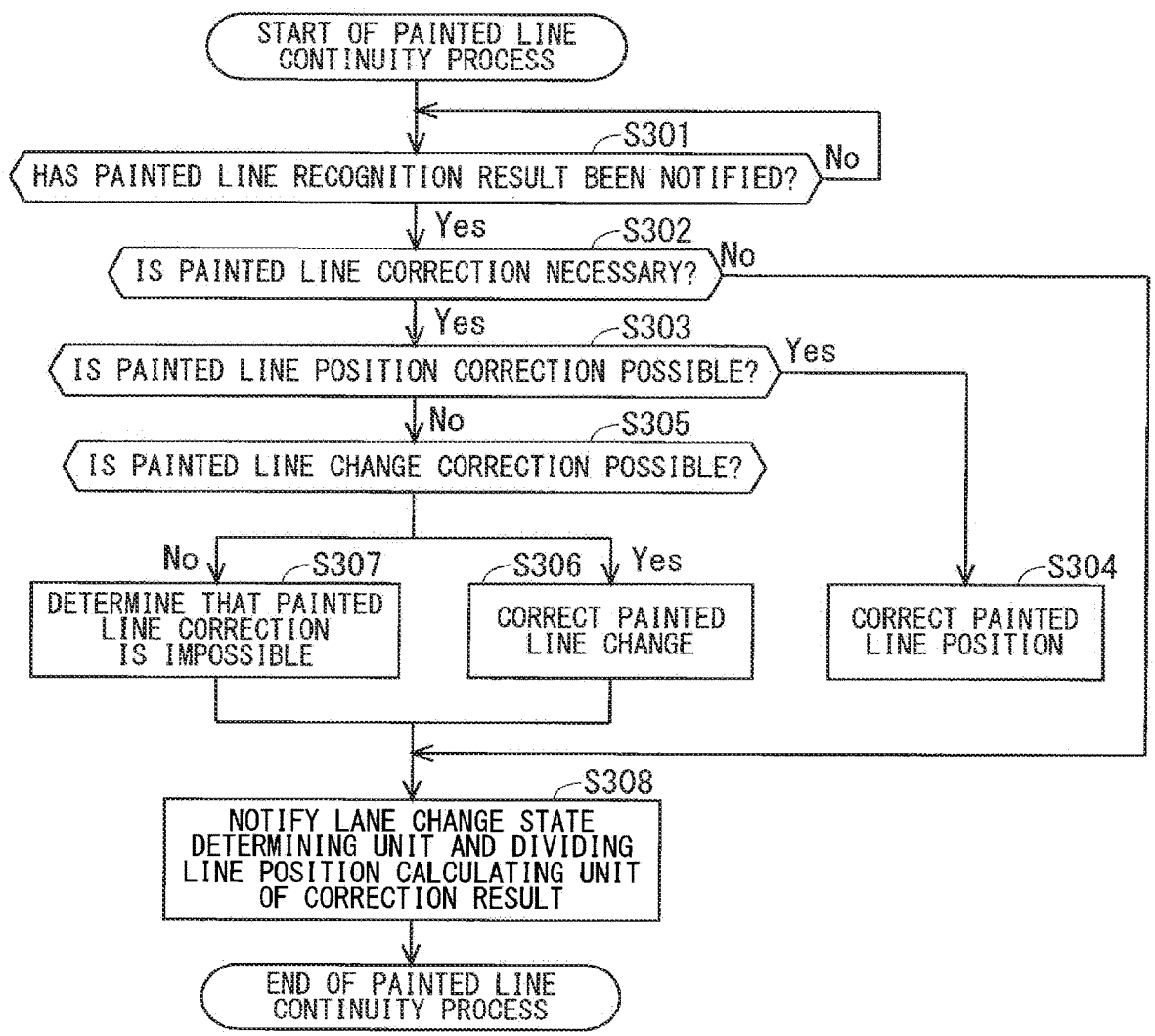
FIG. 11 is a flow chart showing an example of an operation of a painted line continuity correcting unit according to the second embodiment of the present invention.

FIG. 11 is a flowchart showing an example of the operation of the painted line continuity correcting unit 16.

In step S301, the painted line continuity correcting unit 16 waits until being notified of the painted line recognition result from the painted line recognizing unit 5. Then, upon being notified of the painted line recognition result, the painted line continuity correcting unit 16 proceeds to step S302, and subsequently corrects the painted line recognition result so as to maintain the continuity on a time-series basis. At that time, a past painted line recognition result is based on the time-series data accumulated in the time-series data accumulating unit 19.

Since the painted line recognition result from the painted line recognizing unit 5 contains noise due to a travel environment or a state of a road marking, the lateral position and inclination of the painted line may contain an error. Specifically, it is conceivable that, even when the road marking of the dividing line is continuous, the lateral position of the painted line is detected as being discontinuous, a linear object other than the road marking of the dividing line is erroneously detected, or a road marking of a dividing line of a lane other than the lane where the vehicle is in travel is detected. Therefore, with attention paid to temporal changes in the detection positions of the left painted line and the right painted line, (C) detection and correction of a position detection error of the painted line under the influence of noise, that is, detection and correction of the painted line position, and (D) detection and correction of movement of the detected painted line to the adjacent painted line, that is, detection and correction of a change in painted line are performed.

First, a description will be given of (C) detection and correction of the painted line position under the influence of noise. A condition for correction of the painted line position is that an amount of temporal change in the lateral position of the painted line exceeds a threshold. This corresponds to proceeding to step S304 when a determination is made in step S303 that the painted line position can be corrected. However, when both the temporal changes in the lateral position of the right painted line and the lateral position of the left painted line exceed the threshold, a determination is made that the painted line position cannot be corrected. This corresponds to proceeding to step S305 when a determination is made in step S303 that the painted line position cannot be corrected.

In a method for correcting the painted line position executed in step S306, one of the left painted line and the right painted line that is smaller in amount of temporal lateral movement is determined as that higher in reliability, and based on the position of the one painted line higher in reliability and using the lane width contained in the map information, the position of the other painted line is calculated. Such a process corresponds to step S304. That is, the painted line continuity correcting unit 16 determines that the right painted line corresponds to the left dividing line at the current time when a difference between the position of the left dividing line that is a dividing line adjacent to a left side of the vehicle obtained a predetermined time before a current time accumulated in the time-series data accumulating unit 19 and the position of the right painted line that is a painted line adjacent to a right side of the vehicle at the current time recognized by the painted line recognizing unit 5 is within a predetermined distance and calculates the position of the right dividing line that is a dividing line adjacent to the right side of the vehicle at the current time based on the left dividing line at the current time and the lane width contained in the map information, and determines that the left painted line corresponds to the right dividing line at the current time when a difference between the position of the right dividing line obtained a predetermined time before a current time accumulated in the time-series data accumulating unit 19 and the position of the left painted line that is a painted line adjacent to the left side of the vehicle at the current time recognized by the painted line recognizing unit 5 is within the predetermined distance and calculates the position of the left dividing line at the current time based on the right dividing line at the current time and the lane width.

For example, it is assumed that the position of the left painted line and the position of the right painted line at the current time (t) by the painted line recognizing unit 5 are represented by the following Equations (15), (16), respectively.

$$y = L_{0,t} + L_{1,t} \cdot x + f_{L,t}(x) \tag{15}$$

$$y = R_{0,t} + R_{1,t} \cdot x + f_{R,t}(x) \tag{16}$$

In Equations (15), (16), $L_{0,t}$ denotes the lateral position of the left painted line at the time t calculated by the painted line recognizing unit 5, and $R_{0,t}$ denotes the lateral position of the right painted line at the time t calculated by the painted line recognizing unit 5. $L_{1,t}$ denotes the inclination of the left painted line at the time t calculated by the painted line recognizing unit 5, and $R_{1,t}$ denotes the inclination of the right painted line at the time t calculated by the painted line recognizing unit 5. Further, $f_{L,t}(x)$ and $f_{R,t}(x)$ denote a two- or more-dimensional polynomial of the left painted line at the time t calculated by the painted line recognizing unit 5 and a two- or more-dimensional polynomial of the right painted line at the time t calculated by the painted line recognizing unit 5, respectively, and are used as error terms in the present embodiment.

Further, it is assumed that the position of the left dividing line and the position of the right dividing line at the previous time (t-1) accumulated in the time-series data accumulating unit 19 are represented by the following Equations (17), (18), respectively.

$$y = L^{(D)}_{0,t-1} + L^{(D)}_{1,t-1} \cdot x + f^{(D)}_{L,t-1}(X) \tag{17}$$

$$y = R^{(D)}_{0,t-1} + R^{(D)}_{1,t-1} \cdot x + f^{(D)}_{R,t-1}(x) \tag{18}$$

In Equations (17), (18), $L^{(D)}_{0,t}$ denotes the lateral position of the left dividing line at the time t determined by the dividing line position calculating unit 18 and accumulated in the time-series data accumulating unit 19, $R^{(D)}_{0,t}$ denotes the lateral position of the right dividing line at the time t determined by the dividing line position calculating unit 18 and accumulated in the time-series data accumulating unit 19, $L^{(D)}_{1,t}$ denotes the inclination of the left dividing line at the time t determined by the dividing line position calculating unit 18 and accumulated in the time-series data accumulating unit 19, and $R^{(D)}_{1,t}$ denotes the inclination of the right dividing line at the time t determined by the dividing line position calculating unit 18 and accumulated in the time-series data accumulating unit 19. Further, $f^{(D)}_{L,t}(x)$ and $f^{(D)}_{R,t}(x)$ denote a two- or more-dimensional polynomial of the left painted line at the time t determined by the dividing line position calculating unit 18 and a two- or more-dimensional polynomial of the right painted line at the time t determined by the dividing line position calculating unit 18, respectively, and are used as error terms in the present embodiment.

With the variables defined as described above, it is assumed that a relation between the parameters satisfies, for example, the following Inequalities (19), (20).

$$|L_{0,t} - L^{(D)}_{0,t-1}| \le \theta_{0,diff} \tag{19}$$

$$|R_{0,t} - R^{(D)}_{0,t-1}| > \theta_{0,diff} \tag{20}$$

In Inequalities (19), (20), $\theta_{0,diff}$ denotes a threshold parameter representing an upper limit of continuity of a zero-order coefficient of the painted line and may be changed in accordance with an output frequency of the painted line recognition result such that, for example, when the painted line recognition result is output at 10 Hz, $\theta_{0,diff}$ is made equal to 50 cm, and when the painted line recognition result is output at 2 Hz, $\theta_{0,diff}$ is made equal to 100 cm. In this configuration, the left painted line can be considered to be changed continuously from Inequality (19), but the right painted line can be considered not to be changed continuously from the Inequality (20). Therefore, the position of the right painted line is corrected based on the position of the left painted line. Specifically, the coefficients of the position of the left painted line and the position of the right painted line after correction to satisfy continuity as shown in the following Equations (21), (22) are calculated from the following Equations (23) to (28).

$$y = L^{(C)}_{0,t} + L^{(C)}_{1,t} \cdot x + f^{(C)}_{L,t}(x) \tag{21}$$

$$y = R^{(C)}_{0,t} + R^{(C)}_{1,t} \cdot x + f^{(C)}_{R,t}(x) \tag{22}$$

$$L^{(C)}_{0,t} = L_{0,t} \tag{23}$$

$$L^{(C)}_{1,t} = L_{1,t} \tag{24}$$

$$f^{(C)}_{L,t}(x) = f_{L,t}(x) \tag{25}$$

$$R^{(C)}_{0,t} = L^{(C)}_{0,t} + Wid_t \tag{26}$$

$$R^{(C)}_{1,t} = L^{(C)}_{1,t} + Dir_t \tag{27}$$

$$f^{(C)}_{R,t}(X) = f^{(C)}_{L,t}(X) \tag{28}$$

In Equations (21) to (28), $L^{(C)}_{1,t}$ denotes the lateral position of the left painted line at the time t after the continuity correction made by the painted line continuity correcting unit 16, $R^{(C)}_{0,t}$ denotes the lateral position of the right painted line at the time t after the continuity correction made by the painted line continuity correcting unit 16, $L^{(C)}_{1,t}$ denotes the inclination of the left painted line at the time t after the continuity correction made by the painted line continuity correcting unit 16, and $R^{(C)}_{1,t}$ denotes the inclination of the right painted line at the time t after the continuity correction made by the painted line continuity correcting unit 16. Further, $f^{(C)}_{L,t}(x)$ and $f^{(C)}_{R,t}(x)$ denotes a two- or more-dimensional polynomial of the left painted line at the time t after the continuity correction made by the painted line continuity correcting unit 16 and a two- or more-dimensional polynomial of the right painted line at the time t after the continuity correction made by the painted line continuity correcting unit 16, respectively, and are used as error terms in the present embodiment.

Furthermore, $Wid_t$ denotes the lane width that may be a width of a lane in the vicinity of the current point acquired from the map information acquiring unit 11 or may be calculated from the following Equation (29) that takes into consideration a difference between the lane width taken by the camera and the actual lane width.

$$Wid_t = (R^{(D)}_{0,t-1} - L^{(D)}_{0,t-1}) * (W_{Map,t}/W_{Map,t-1}) \quad (29)$$

In Equation (29), $W_{Map,t}$ denotes a lane width of a lane where the vehicle is in travel acquired from the map information acquiring unit 11 at the current time (t), and $W_{Map,t-1}$ denotes a lane width of a lane where the vehicle is in travel acquired from the map information acquiring unit 11 at the previous time (t−1).

Further, $Dir_t$ denotes an angle difference between the right dividing line and the left dividing line. In most points except for the vicinity of a point where the number of lanes increases or decreases, the right dividing line and the left dividing line are parallel to each other, so that $Dir_t$ may be set to 0 or may be calculated from the following Equation (30) that takes into consideration the angle difference between the left dividing line and the right dividing line.

$$Dir_t = Dir_{Map,R,t} - Dir_{Map,L,t} \quad (30)$$

In Equation (30), $Dir_{Map,R,t}$ denotes the direction of the right dividing line of the lane where the vehicle is in travel at a travel point at the current time t acquired from the map information acquiring unit 11, and $Dir_{Map,L,t}$ denotes the direction of the left dividing line of the lane where the vehicle is in travel at the travel point at the current time t acquired from the map information acquiring unit 11.

A description has been given above of (C) detection and correction of the painted line position under the influence of noise with reference to a case where Inequalities (19), (20) are satisfied, that is, the correction is performed based on the position of the left painted line. The same applies to a case where the correction is performed based on the position of the right painted line, that is, the following Inequalities (31), (32) are satisfied.

$$|L_{1,t} - L^{(D)}_{0,t-1}| > \theta_{0,diff} \quad (31)$$

$$|R_{0,t} - R^{(D)}_{0,t-1}| \leq \theta_{0,diff} \quad (32)$$

Next, a description will be given of (D) detection and correction of movement of the detected painted line to the adjacent painted line, that is, detection and correction of a change in painted line. When a difference between the lateral position of the left painted line at the previous time (t-1) and the lateral position of the right painted line at the current time (t) is equal to or less than the threshold, that is, when a determination in step S305 of FIG. 11 results in Yes, it proceeds to S306. In step S306, the painted line continuity correcting unit 16 determines that the two painted lines are the same, and sets the painted line detected as the right painted line at the current time (t) as the left dividing line. At this time, the position of the right dividing line is calculated, based on the position of the left dividing line, using the lane width contained in the map information.

For example, it is assumed that the position of the left painted line and the position of the right painted line at the current time (t) recognized by the painted line recognizing unit 5 are represented by Equations (15), (16), and the position of the left dividing line and the position of the right dividing line at the previous time (t-1) accumulated in the time-series data accumulating unit 19 are represented by Equations (17), (18). Further, it is assumed that a relation between the parameters satisfies the following Inequality (33).

$$|R_{0,t} - L^{(D)}_{0,t-1}| \leq \theta_{0,diff} \quad (33)$$

In this case, the amount of change between the left painted line at the previous time and the right painted line at the current time is equal to or less than the threshold, and accordingly both the painted lines are presumed to be identical to each other. Therefore, since it is considered that the painted line taken by the camera has changed to the left painted line, the painted line information is replaced.

Specifically, coefficients of the position of the left painted line and the position of the right painted line after the continuity correction as shown in the following Equations (34), (35) are calculated from the following Equations (36) to (41).

$$y = L^{(C)}_{0,t} + L^{(C)}_{1,t} \cdot x + f^{(C)}_{L,t}(x) \quad (34)$$

$$y = R^{(C)}_{0,t} + R^{(C)}_{1,t} \cdot x + f^{(C)}_{R,t}(x) \quad (35)$$

$$L^{(C)}_{0,t} = R_{0,t} \quad (36)$$

$$L^{(C)}_{1,t} = R_{1,t} \quad (37)$$

$$f^{(C)}_{L,t}(X) = f_{R,t}(x) \quad (38)$$

$$R^{(C)}_{0,t} = L^{(C)}_{0,t} + Wid_t \quad (39)$$

$$R^{(C)}_{1,t} = L^{(C)}_{1,t} + Dir_t \quad (40)$$

$$f^{(C)}_{R,t}(X) = f^{(C)}_{L,t}(x) \quad (41)$$

In Equations (34) to (41), $Wid_t$ denotes the lane width that may be a width of a lane in the vicinity of the current point acquired from the map information acquiring unit 11 or may be calculated from Equation (29).

Further, $Dir_t$ denoting an angle difference between the right dividing line and the left dividing line may be set to 0 or may be calculated from Equation (30).

A description has been given above of (D) detection and correction of movement of the detected painted line to the adjacent painted line, that is, detection and correction of a change in painted line, with reference to a case where Inequality (33) is satisfied, that is, the painted line taken by the camera has changed to the left painted line and a case where the painted line taken by the camera has changed to the right painted line, that is, the correction is performed based on the position of the left painted line. The same applies to a case where the correction is performed based on the position of the right painted line, that is, the following Inequality (42) is satisfied.

$$|L_{0,t} - R^{(D)}_{0,t-1}| \leq \theta_{0,diff} \quad (42)$$

When both determinations in step S303 and step S305 result in No, that is, noise that cannot be corrected by the painted line continuity correcting unit 16 is contained, the painted line continuity correcting unit 16 determines in step S307 that the painted line cannot be corrected. Specifically, when all of the following Inequalities (43) to (46) are satisfied, the painted line continuity correcting unit 16 determines that the painted line cannot be corrected.

$$|L_{0,t} - L^{(D)}_{0,t-1}| > \theta_{0,diff} \quad (43)$$

$$|R_{0,t} - R^{(D)}_{0,t-1}| > \theta_{0,diff} \quad (44)$$

$$|L_{0,t} - R^{(D)}_{0,t-1}| > \theta_{0,diff} \quad (45)$$

$$|R_{0,t} - L^{(D)}_{0,t-1}| > \theta_{0,diff} \quad (46)$$

In step S308, the painted line continuity correcting unit 16 notifies the lane change state determining unit 17 and the dividing line position calculating unit 18 of the parameters $L^{(C)}_{0,t}$, $L^{(C)}_{1,t}$, $R^{(C)}_{0,t}$, $R^{(C)}_{1,t}$ and the polynomials $f^{(C)}_{L,t}(x)$, $f^{(C)}_{R,t}(x)$ thus corrected.

<Operation of Lane Change State Determining Unit 17>

Figure 12:
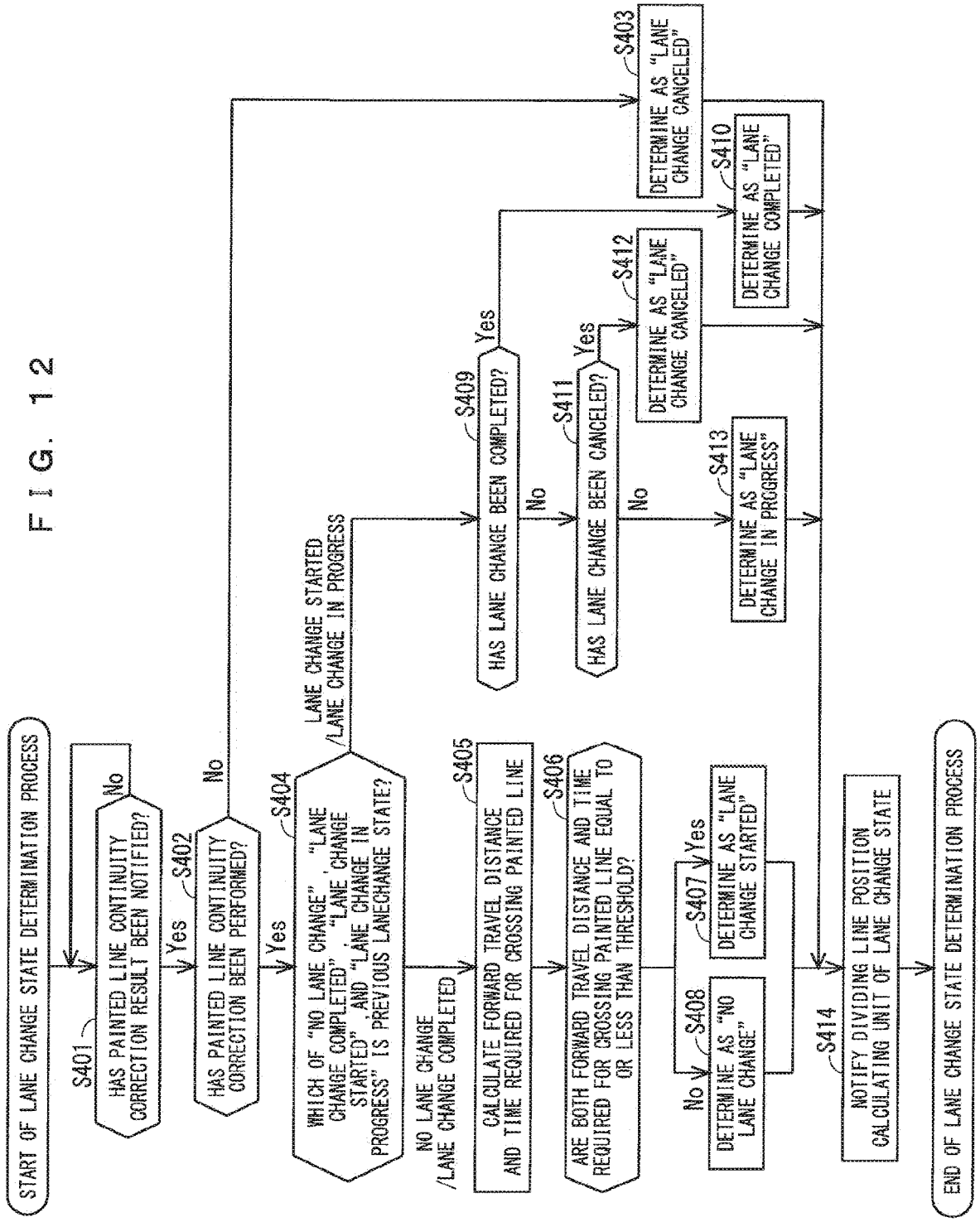
FIG. 12 is a flowchart showing an example of an operation of a lane change state determining unit according to the second embodiment of the present invention.

FIG. 12 is a flowchart showing an example of the operation of the lane change state determining unit 17. The lane change state determining unit 17 determines a lane change state of the vehicle based on the position information on the painted line after the continuity correction made by the painted line continuity correcting unit 16. The lane change state includes "no lane change", "lane change started", "lane change in progress", "lane change completed", "lane change canceled", and "lane change indefinite".

In step S401, the lane change state determining unit 17 waits until being notified of the painted line continuity correction result. Then, upon being notified of the painted line continuity correction result, the lane change state determining unit 17 proceeds to step S402.

In step S402, the lane change state determining unit 17 determines whether the painted line continuity correcting unit 16 has made correction to make the painted line continuous. In order to identify the lane change state, the lateral positions and inclinations of the continuously changing left painted line and right painted line acquired from the painted line continuity correcting unit 16. When the painted line continuity correcting unit 16 have not made correction to make the painted line continuous, the lane change state determining unit 17 proceeds to step S403. On the other hand, when the painted line continuity correcting unit 16 have made correction to make the painted line continuous, the lane change state determining unit 17 proceeds to step S404. In step S403, the lane change state determining unit 17 determines that the lane change state is "lane change indefinite".

In step S404, the lane change state determining unit 17 determines whether the previous lane change state is "no lane change", "lane change completed", "lane change started", or "lane change in progress". In a case of "no lane change" or "lane change completed", the lane change state determining unit 17 proceeds to step S405. On the other hand, in a case of "lane change started" or "lane change in progress", the lane change state determining unit 17 proceeds to step S409.

In step S405, when the previous lane change state is "no lane change", the lane change state determining unit 17 determines whether there is a sign of start of lane change. Specifically, the forward travel distance for the vehicle to cross the dividing line is calculated by dividing the lateral position of the left dividing line by the inclination to the left dividing line. This is referred to as a forward travel distance for crossing, or a crossing forward travel distance. Further, a time required for the vehicle to cross the dividing line is calculated by dividing the lateral position of the left dividing line by the amount of temporal change to the left dividing line and multiplying the result of the division by a time coefficient. This is referred to as a time required for crossing or a crossing required time.

For example, under a condition of $L^{(C)}_{0,t}<0$ and $L^{(C)}_{1,t}>0$, the forward travel distance $D_L$ for crossing the left painted line and the time $T_L$ required for crossing the left painted line are calculated from the following Equations (47), (48), respectively.

$$D_L = (-L^{(C)}_{0,t})/L^{(C)}_{1,t} \quad (47)$$

$$T_L = (-L^{(C)}_{0,t})/L^{(C,DiffAVE)}_{0,t} * T_{Diff} \quad (48)$$

In Equation (48), $T_{Diff}$ denotes an elapsed time per frame. $L^{(C,DiffAVE)}_{0,t}$ denotes an average change rate per frame of the lateral position of the left painted line at around the current time (t), and is calculated from the following Equation (49) using an averaging parameter N.

$$L^{(C,DiffAVE)}_{0,t} = (L^{(C)}_{0,t} - L^{(D)}_{0,t-N})/N \quad (49)$$

Note that it is assumed that, as the lateral position of the left painted line at the time (t-N), a value $L^{(D)}_{0,t-N}$ after determination by the correction process made by the dividing line position calculating unit 18 is acquired from the time-series data accumulating unit 19 and used. Further, since the lateral position of the left painted line at the current time (t) is yet to be determined, a values $L^{(C)}_{0,t}$ after the continuity correction made by the painted line continuity correcting unit 16 is used.

In step S406, the lane change state determining unit 17 determines whether both of the forward travel distance for crossing and the time required for crossing are equal to or less than a threshold. When both of the forward travel distance for crossing and the time required for crossing are less than or equal to the threshold, the lane change state determining unit 17 proceeds to step S407. On the other hand, when one or both of the forward travel distance for crossing and the time required for crossing are greater than the threshold, the lane change state determining unit 17 proceeds to step S408.

In step S407, the lane change state determining unit 17 determines that a case where the forward travel distance $D_L$ for crossing and the time $T_L$ required for crossing fall below predetermined thresholds $\theta_D$ and $\theta_T$, respectively, that is, the following Inequalities (50), (51) are both satisfied is a sign of lane change and determines that the lane change state is "lane change started".

$$D_L < \theta_D \quad (50)$$

$$T_L < \theta_T \quad (51)$$

For example, the threshold $\theta_D$ of the forward travel distance for crossing may be 30 m, and the threshold $\theta_T$ of the time required for crossing may be 3 seconds. After the lane change state is determined as "lane change started", the lane change state is automatically determined as "lane change in progress" until being determined as either "lane change completed" or "lane change canceled". That is, the lane change state determining unit 17 calculates the crossing forward travel distance and the crossing required time based on the time-series data obtained during a predetermined time including a current time accumulated in the time-series data accumulating unit 19 and the positions of the left dividing line and right dividing line corrected by the painted line continuity correcting unit 16, and determines whether the vehicle starts a lane change based on the crossing forward travel distance and the crossing required time and determines, when the vehicle starts the lane change, the direction of the lane change.

In step S408, the lane change state determining unit 17 determines that the lane change state is "no lane change".

In step S409, the lane change state determining unit 17 determines whether the lane change is completed. When the lane change is completed, the lane change state determining unit 17 proceeds to step S410. On the other hand, when the lane change is yet to be completed, the lane change state determining unit 17 proceeds to step S411.

In step S410, the lane change state determining unit 17 determines that the lane change state is "lane change completed". For example, in a case where a lane change start direction is left, the lane change state is determined as "lane change completed" when the lateral position of the left dividing line exceeds a threshold $\theta_{0,complete}$ that is a predetermined first threshold greater than 0. The threshold $\theta_{0,complete}$ is, for example, 0.5 m. As with $\theta_{0,diff}$, the threshold $\theta_{0,complete}$ may be changed in accordance with the output frequency of the painted line recognition result.

In step S411, the lane change state determining unit 17 determines whether the lane change is canceled. When the lane change is canceled, the lane change state determining unit 17 proceeds to step S412. On the other hand, when the lane change is not canceled, the lane change state determining unit 17 proceeds to step S413.

In step S412, the lane change state determining unit 17 determines that the lane change state is "lane change canceled". For example, in a case where the lane change start direction is left, the lane change state is determined as "lane change canceled" when the lateral position of the left dividing line falls below a threshold $-\theta_{0,cancel}$ that is a predetermined second threshold less than 0. The threshold $\theta_{0,cancel}$ is, for example, −0.8 m. The same applies to a case where the lane change start direction is right. As with $\theta_{0,diff}$, the threshold $\theta_{0,cancel}$ may be changed in accordance with the output frequency of the painted line recognition result.

In step S413, the lane change state determining unit 17 determines that the lane change state is "lane change in progress".

In step S414, the lane change state determining unit 17 notifies the dividing line position calculating unit 18 of the lane change state.

A description has been given above of the case where the lane change start direction is left. The same applies to a case where the lane change start direction is right.

<Operation of Dividing Line Position Calculating Unit 18>

The dividing line position calculating unit 18 calculates the position of the dividing line based on the position of the painted line that has been corrected to be continuous by the painted line continuity correcting unit 16 and the lane change state determined by the lane change state determining unit 17. Unless the lane change state determining unit 17 determines that the lane change state is "lane change completed", the position of the dividing line is the same as the position of the painted line that has been corrected by the painted line continuity correcting unit 16. Hereinafter, a description will be given of a process in the case where the lane change state determining unit 17 determines that the lane change state is "lane change completed".

For example, when the lane change state determining unit 17 determines that the lane change to the right lane is completed, the dividing line position calculating unit 18 calculates both the lateral positions of the left dividing line and right dividing line of the right lane. The lateral positions of the left dividing line and right dividing line of the right lane are calculated by the following method. The left dividing line of the right lane is the right dividing line of the current lane. The right dividing line of the right lane is calculated in the same way as Equations (34) to (41) used for correcting the change in the painted line in the painted line continuity correcting unit 16, using the lane width contained in the map information with reference to the left dividing line of the right lane. That is, when the dividing line position calculating unit 18 calculates, when the lane change state determining unit 17 determines that the lane change is completed, the positions of the left dividing line and right dividing line adjacent to both sides of the vehicle after lane change based on the left dividing line after the correction calculated by the painted line continuity correcting unit 16 and the lane width contained in the map information.

Specifically, coefficients of the position of the left dividing line and the position of the right dividing line with the lane change taken into consideration as shown in the following Equations (52), (53) are calculated from the following Equations (54) to (59).

$$y = L^{(D)}_{0,t} + L^{(D)}_{1,t} x + f^{(D)}_{L,t}(x) \quad (52)$$

$$y = R^{(D)}_{0,t} + R^{(D)}_{1,t} x + f^{(D)}_{R,t}(x) \quad (53)$$

$$L^{(D)}_{0,t} = R^{(C)}_{0,t} \quad (54)$$

$$L^{(D)}_{1,t} = R^{(C)}_{1,t} \quad (55)$$

$$f^{(D)}_{L,t}(X) = f^{(C)}_{R,t}(x) \quad (56)$$

$$R^{(D)}_{0,t} = L^{(D)}_{0,t} + Wid_t \quad (57)$$

$$R^{(D)}_{1,t} = L^{(D)}_{1,t} + Dir_t \quad (58)$$

$$f^{(D)}_{R,t}(X) = f^{(D)}_{L,t}(x) \quad (59)$$

In Equations (52) to (59), $L^{(D)}_{0,t}$ denotes the lateral position of the left dividing line at the time t determined by the dividing line position calculating unit 18, $R^{(D)}_{0,t}$ denotes the lateral position of the right dividing line at the time t determined by the dividing line position calculating unit 18, $L^{(D)}_{1,t}$ denotes the inclination of the left dividing line at the time t determined by the dividing line position calculating unit 18, and $R^{(D)}_{1,t}$ denotes the inclination of the right dividing line at the time t determined by the dividing line position calculating unit 18. Further, $Wid_t$ denotes the lane width that may be a width of a lane in the vicinity of the current point acquired from the map information acquiring unit 11 or may be calculated from Equation (29).

Next, a description will be given of the determination of whether a lane change has been made and a direction of the lane change made by the dividing line position calculating unit 18. When the lane change state determined by the lane change state determining unit 17 is any of "no lane change", "lane change started", "lane change in progress", and "lane change canceled", the dividing line position calculating unit 18 determines that whether a lane change has been made is "No". When the lane change state determined by the lane change state determining unit 17 is "lane change completed", the dividing line position calculating unit 18 determines that whether a lane change has been made is "Yes", and, as the direction of the lane change, a direction notified from lane change state determining unit 17 is used. When the lane change state determined by the lane change state determining unit 17 is "lane change impossible", the dividing line position calculating unit 18 determines that whether a lane change has been made is "Indefinite".

<Operation of Time-Series Data Accumulating Unit 19>

The time-series data accumulating unit 19 stores and accumulates past positions of the dividing line calculated by the dividing line position calculating unit 18 as time-series data. The time-series data accumulated in the time-series data accumulating unit 19 is read out and used when the painted line continuity correcting unit 16 and the lane change state determining unit 17 make a comparison using the past positions of the dividing line.

The buffer of the time-series data accumulating unit 19 has a fixed size, and when the buffer becomes full, data in the buffer is deleted in chronological order. Therefore, the time-series data accumulating unit 19 suitably has a data structure of a ring buffer type.

<Calculation Order of Local Variables in Painted Line Recognition Result Processing Unit 15>

Figure 13:
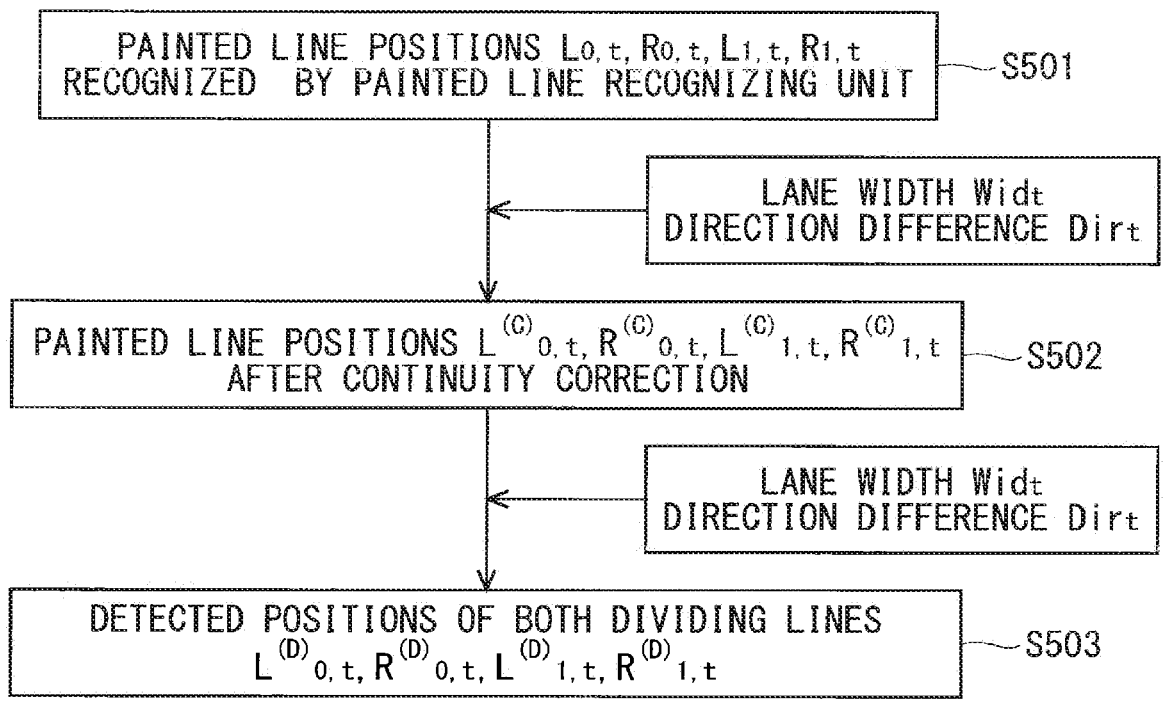
FIG. 13 is a diagram for describing a calculation order of local variables in a painted line recognition result processing unit according to the second embodiment of the present invention.

FIG. 13 is a diagram for describing the calculation order of local variables in the painted line recognition result processing unit 15.

In step S501, the painted line continuity correcting unit 16 is notified, from the painted line recognizing unit 5, of the lateral position $L_{0,t}$ of the left painted line at the time t, the lateral position $R_{0,t}$ of the right painted line at the time t, the inclination $L_{1,t}$ of the left painted line at the time t, and the inclination $R_{1,t}$ of the right painted line at the time t.

In step S502, the painted line continuity correcting unit 16 calculates, with the lane width $\text{Wid}_t$ and the direction difference $\text{Dir}_t$ taken into consideration, the lateral position $L^{(C)}_{0,t}$ of the left painted line at the time t after continuity correction, the lateral position $R^{(C)}_{0,t}$ of the right painted line at the time t after continuity correction, the inclination $L^{(C)}_{1,t}$ of the left painted line at the time t after continuity correction, and the inclination $R^{(C)}_{1,t}$ of the right painted line at the time t after continuity correction.

In step S503, the dividing line position calculating unit 18 calculates, with the lane width $\text{Wid}_t$ and the direction difference $\text{Dir}_t$ taken into consideration, the lateral position $L^{(D)}_{0,t}$ of the left painted line at the time t, the lateral position $R^{(D)}_{0,t}$ of the right painted line at the time t, the inclination $L^{(D)}_{1,t}$ of the left painted line at the time t, and the inclination $R^{(D)}_{1,t}$ of the right painted line at the time t for $L^{(C)}_{0,t}$, $R^{(C)}_{0,t}$, $L^{(C)}_{1,t}$, and $R^{(C)}_{1,t}$ calculated by the painted line continuity correcting unit 16. $L^{(D)}_{0,t}$, $R^{(D)}_{0,t}$, $L^{(D)}_{1,t}$, and $R^{(D)}_{1,t}$, calculated by the dividing line position calculating unit 18 are notified to the time-series data accumulating unit 19 and the vehicle lateral position calculating unit 7. An operation after the vehicle lateral position calculating unit 7 acquires these pieces of information is the same as in the first embodiment.

<Effect>

In the second embodiment, the painted line continuity correcting unit 16 makes correction to make the position of the painted line recognized by the painted line recognizing unit 5 continuous, the lane change state determining unit 17 determines the lane change state with past positions of the dividing line taken into consideration, and the dividing line position calculating unit 18 calculates the position of the dividing line using all of these pieces of information, which increases robustness against noise or a recognition error contained in the output from the road imaging device 3 or the painted line recognizing unit 5.

Third Embodiment

<Structure>

In the first and second embodiments, the vehicle position estimation system updates the lateral position using the imaging result of the camera, and updates the longitudinal position based on the forward travel distance calculated by the vehicle forward travel distance calculating unit 10. At this time, the initial position serving as the base of the updating corresponds to a positioning position input from the satellite positioning device 12 to the on-map vehicle position initializing unit 9. However, when the positioning result of the satellite positioning device 12 contains an error in the lateral direction, the initial position is set on a wrong travel lane, which makes a problem that the on-map vehicle position calculating unit 8 may continue erroneous determination of a travel lane remain. The third embodiment of the present invention solves such a problem.

In the first and second embodiments, the vehicle position estimation system updates, based on the position initialized by the on-map vehicle position initializing unit 9, the vehicle position with the vehicle lateral position calculated by the vehicle lateral position calculating unit 7 using the imaging result of the camera as an input. The third embodiment is intended to solve the problem by causing the vehicle position estimation system to perform reliability evaluation based on both the initialization position and the updated position and, only when the reliability meets a certain standard, to determine that the vehicle position has been determined with high accuracy and select the position updated based on the imaging result of the camera. On the other hand, when the reliability does not meet the standard, the vehicle position estimation system selects the initialization position with low accuracy, and makes the vehicle position with high accuracy undetermined.

Figure 14:
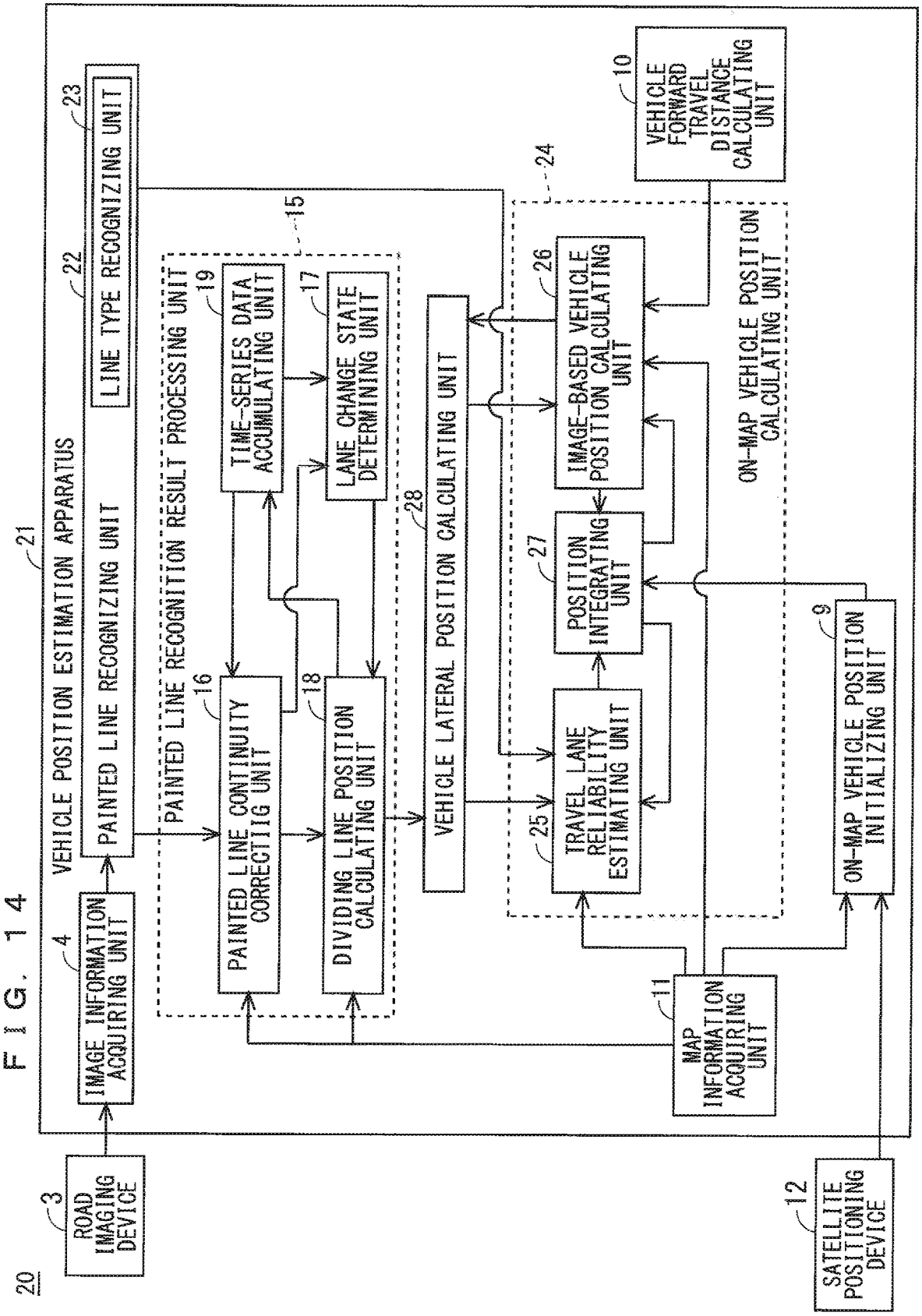
FIG. 14 is a block diagram showing an example of a structure of a vehicle position estimation system according to a third embodiment of the present invention.

FIG. 14 is a block diagram showing an example of a structure of a vehicle position estimation system 20 according to the third embodiment. As shown in FIG. 14, a vehicle position estimation apparatus 21 according to the third embodiment includes a painted line recognizing unit 22, an on-map vehicle position calculating unit 24, and a vehicle lateral position calculating unit 28. Other components and operations are identical to the equivalent components and operations of the second embodiment; thus, detailed descriptions of the other components and operations are omitted herein.

The painted line recognizing unit 22 includes a line type recognizing unit 23.

When the painted line recognizing unit 22 detects a plurality of painted lines on the road from an image representing an area in front of the vehicle acquired by the image information acquiring unit 4, the line type recognizing unit 23 analyzes the painted lines in more detail to estimate a line type of each of the painted lines. The line type represents the type of line pattern (shape), and is classified into types such as a solid line, a long dashed line, a short dashed line, and a double line based on line types existing in the actual road environment.

The on-map vehicle position calculating unit 24 includes a travel lane reliability estimating unit 25, an image-based vehicle position calculating unit 26, and a position integrating unit 27.

The travel lane reliability estimating unit 25 make a comprehensive determination with reference to whether the painted line recognizing unit 22 has successfully recognized the painted line, whether the line type recognized by the line type recognizing unit 23 is a stable result on a time-series basis, and whether an on-map vehicle position calculated by the position integrating unit 27 indicates, in a continuous and stable manner, a position near the center of the lane on a time-series basis to estimate the reliability of the travel lane calculated by the vehicle lateral position calculating unit 28.

The image-based vehicle position calculating unit 26 operates in the same manner as the whole of the on-map vehicle position calculating unit 8 in the first embodiment operates. When the vehicle lateral position is notified from the vehicle lateral position calculating unit 28, the on-map vehicle lateral position is updated, and when the vehicle forward travel distance is notified from the vehicle forward travel distance calculating unit 10, the on-map vehicle position in the front-to-back direction is updated. Since the vehicle position calculated in this manner is a vehicle position calculated using the lateral position calculated based on the image information input from the image information acquiring unit 4, such a vehicle position is referred to as an image-based vehicle position.

When the travel lane reliability estimated by the travel lane reliability estimating unit 25 is less than a threshold, the position integrating unit 27 determines that the image-based vehicle position calculated by the image-based vehicle position calculating unit 26 has low reliability, and selects the initialization position output from the on-map vehicle position initializing unit 9 as the calculation result of the on-map vehicle position calculating unit 24.

On the other hand, when the travel lane reliability estimated by the travel lane reliability estimating unit 25 is equal to or greater than the threshold, the position integrating unit 27 determines that the image-based vehicle position calculated by the image-based vehicle position calculating unit 26 has high reliability based on a result of evaluating the image-based vehicle position using a plurality of evaluation axes, and uses the image-based vehicle position as the calculation result of the on-map vehicle position calculating unit 24.

Once the travel lane reliability estimated by the travel lane reliability estimating unit 25 becomes equal to or greater than the threshold, as long as the painted line recognizing unit 22 continues to recognize at least one of the left and right painted lines, and the painted line continuity correcting unit 16 continues the correction without failure, the travel lane reliability is determined as equal to or greater than the threshold, which causes the vehicle position estimation system 20 to continue the use of the image-based vehicle position.

In addition to the role of the vehicle lateral position calculating unit 7 according to the first embodiment, the vehicle lateral position calculating unit 28 has a role of notifying the travel lane reliability estimating unit 25 of a painted line recognition state of the painted line recognizing unit 22, a correction possibility state of the painted line continuity correcting unit 16, and a result of consistency determination on the vehicle lateral position that are necessary for the travel lane reliability estimating unit 25 to perform the reliability estimation. Here, the result of consistency determination on the vehicle lateral position refers to a result of checking whether the vehicle lateral position is located outside the lane (a travel-allowed area) due to the lane change determined by the lane change state determining unit 17.

<Operation>
<Operation of Travel Lane Reliability Estimating Unit 25>

The travel lane reliability estimating unit 25 make a comprehensive determination with reference to whether the painted line recognizing unit 22 has successfully recognized the painted line, whether the line type recognized by the line type recognizing unit 23 is a stable result on a time-series basis, whether the on-map vehicle position calculated by the position integrating unit 27 indicates, in a continuous and stable manner, a position near the center of the lane on a time-series basis, and whether the vehicle lateral position notified by the vehicle lateral position calculating unit 28 is located in the travel-allowed area to estimate the reliability of the travel lane calculated by the vehicle lateral position calculating unit 28. A description will be given below of a specific use case regarding the calculation of the reliability estimation as an example.

On an expressway, in a scene where the vehicle travels on a rampway having one lane and then enters a main line having a plurality of lanes, as long as the painted line recognizing unit 22 continues the recognition of at least one of the left and right painted lines, and the painted line continuity correcting unit 16 continues the correction without failure, a travel lane at the time of entering the main line is uniquely determined, which causes the travel lane reliability estimating unit 25 to determine that the travel lane reliability at the time of entering the main line is high.

On the other hand, no painted line is present near a toll gate or the like, so that, in a scene where the travel lane cannot be identified through monitoring the painted line, the travel lane reliability estimating unit 25 determines that the travel lane reliability is low. During the subsequent travel, when there is a determination material for identifying the travel lane, the reliability increases in accordance with a degree of the determination material.

Further, for example, when the painted line recognizing unit 22 has lost sight of the painted lines on both sides while the vehicle is in travel, it is expected that the travel lane reliability estimating unit 25 determine that the travel lane reliability is lowered in accordance with a duration of the time the painted line recognizing unit 22 has lost sight of the painted lines.

Examples of the calculation method of the reliability having the above features include the following calculation equations of a reliability point.

$$\text{(Current reliability point, in a case of two or more lanes)} = \min((\text{previous reliability point}) + (\text{difference point}), (\text{initialization point})) \quad (60)$$

$$\text{(Current reliability point, in a case of one lane)} = 100 \quad (61)$$

$$\text{(Difference point)} = (\text{line type point } Pt_1) + (\text{in-lane position point } P_{t2}) + (\text{painted line recognition possibility point } Pt_3) + (\text{continuity correction possibility point } Pt_4) \quad (62)$$

$$\text{(Initialization point)} = (\text{lane change to outside road point } Pt_5) \quad (63)$$

$$\text{(Initial value of reliability point)} = 0 \quad (64)$$

$$Pt_1 = -10 \text{(when the type of the left and right dividing lines recognized by the line type recognizing unit 23 does not coincide with the type of the left and right dividing lines on the map at the position of the position integrating unit 27)} \quad (65)$$

$$Pt_1 = 10 \text{(in case of coincidence)} \quad (66)$$

$$Pt_2 = 10 * (1(\text{distance from the center of the lane}[m])) \quad (67)$$

$$Pt_3 = -30 \text{(when at least one of the left and right painted lines has not been recognized)} \quad (68)$$

$$Pt_3 = 0 \text{(when both the painted lines have been successfully recognized)} \quad (69)$$

$$Pt_4 = -30 \text{(when a determination is made that the continuity correction cannot be performed)} \quad (70)$$

$$Pt_4 = 0 \text{(when the continuity correction has been successfully performed)} \quad (71)$$

$$Pt_5 = 0 \text{(when the lane change destination determined by the lane change state determining unit 17 is outside the road)} \quad (72)$$

$$Pt_5 = 0xFFFF \text{(maximum allowable value: when not outside the road)} \quad (73)$$

Here, the reliability point is an index representing magnitude of the reliability in a point representation, and indicates that the higher the reliability point is, the higher the travel lane reliability estimated by the position integrating unit 27 becomes.

Basically, the travel lane reliability estimating unit 25 adds the difference point to the previous reliability point as reference to calculate the current reliability point. However, when a large discrepancy is found in the estimated position thus far, such as when the lane change destination determined by the lane change state determining unit 17 is outside the road, the travel lane reliability estimating unit 25 resets the reliability point accumulated thus far to 0 to reset the vehicle position cumulatively calculated based on the camera in the past.

The position integrating unit 27 is notified of the reliability point of the travel lane calculated by the travel lane reliability estimating unit 25 in accordance with Equations (60) to (73).

<Operation of Image-Based Vehicle Position Calculating Unit 26>

Since the image-based vehicle position calculating unit 26 operates in the same manner as the whole of the on-map vehicle position calculating unit 8 in the first embodiment operates, the flowchart of the operation is as shown in FIG. 6.

<Operation of Position Integrating Unit 27>

Figure 15:
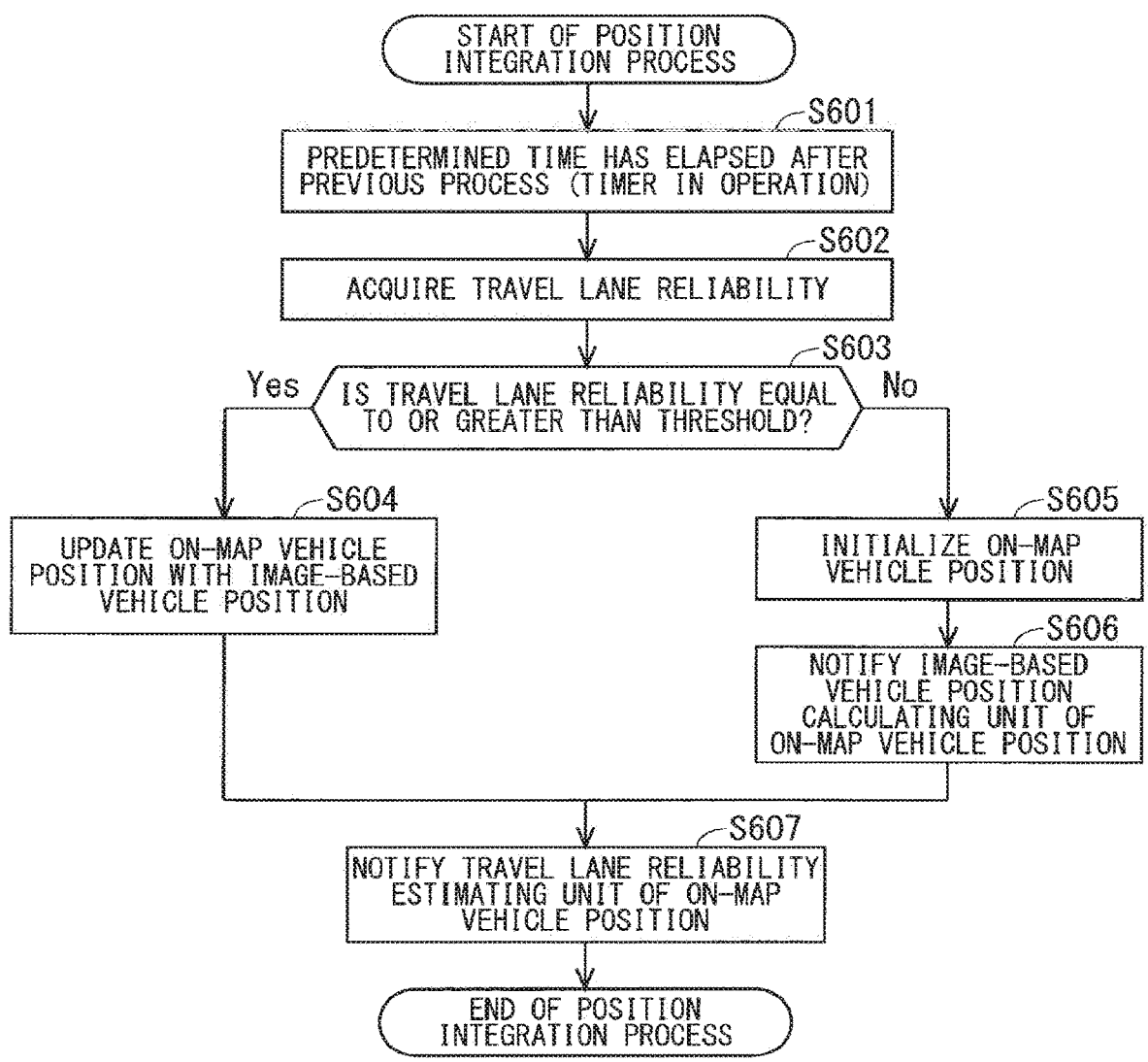
FIG. 15 is a flowchart showing an example of an operation of a position integrating unit according to the third embodiment of the present invention.

FIG. 15 is a flowchart showing an example of the operation of the position integrating unit 27.

In step S601, the position integrating unit 27 waits until a predetermined time (for example, 100 ms) elapses after the previous position integration process. Therefore, the following process will be performed at fixed intervals.

In step S602, the position integrating unit 27 acquires the travel lane reliability most recently estimated by the travel lane reliability estimating unit 25.

In step S603, the position integrating unit 27 determines whether the travel lane reliability thus acquired is equal to or greater than a threshold. In the third embodiment, the travel lane reliability is evaluated in the reliability point representation, and, for example, a determination is made of whether the reliability point is equal to or greater than 100 that is a value predetermined as a threshold.

When the reliability point is equal to or greater than the threshold, the position integrating unit 27 proceeds to step S604. In this case, it is determined that the lateral position calculated by the vehicle lateral position calculating unit 28 is reliable, so that the on-map vehicle position is updated to the image-based vehicle position (a position calculated using the image-based lateral position).

On the other hand, when the reliability point is less than the threshold, the position integrating unit 27 proceeds to step S605 and initializes the on-map vehicle position to the initialization position notified from the on-map vehicle position initializing unit 9. This is because a determination has been made that the image-based vehicle position cumulatively calculated based on the image is unreliable. Thereafter, the position integrating unit 27 proceeds to step S606.

In step S606, the position integrating unit 27 notifies the image-based vehicle position calculating unit 26 of the on-map vehicle position thus initialized. This is because, after the notification, the longitudinal position and the lateral position are updated based on the initialized on-map vehicle position.

Finally, in step S607, the position integrating unit 27 notifies the travel lane reliability estimating unit 25 of the image-based vehicle position or the on-map vehicle position updated to the initial position. The travel lane reliability estimating unit 25 evaluates the correctness of the on-map vehicle position with respect to the lane at the next travel lane reliability estimation.

<Operation of Vehicle Lateral Position Calculating Unit 28>

In addition to the operation of the vehicle lateral position calculating unit 7 according to the first embodiment shown in FIG. 5, the vehicle lateral position calculating unit 28 determines whether the painted line recognizing unit 22 has successfully recognized the painted line, whether the painted line continuity correcting unit 16 has successfully performed the continuity correction, and whether the vehicle position is located outside the travel-allowed area due to the lane change determined by the lane change state determining unit 17, and notifies the travel lane reliability estimating unit 25 of results of the determinations.

<Overall Operation of Vehicle Position Estimation System 20>

Figure 16:
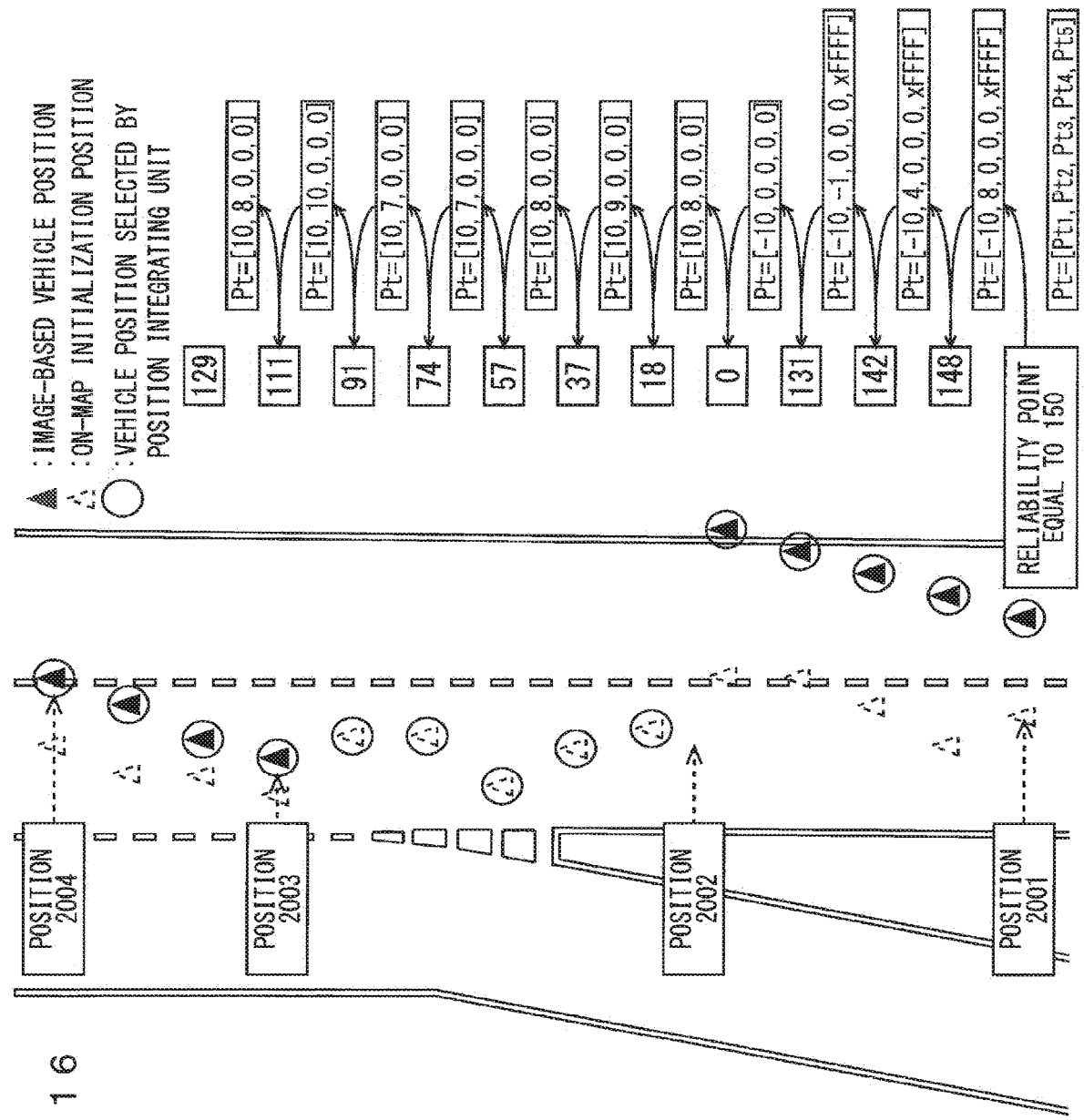
FIG. 16 is a diagram for describing an operation of a vehicle position estimation apparatus according to the third embodiment of the present invention.

A description will be given of the overall operation of the vehicle position estimation apparatus 21 with reference to FIG. 16. As a premise, it is assumed that the position integrating unit 27 calculated the position 2001 at the previous time, and the reliability point estimated by the travel lane reliability estimating unit 25 is 150. In this case, since the reliability point is equal to or greater than 100 that is the threshold, the image-based vehicle position calculated by the image-based vehicle position calculating unit 26 is selected. Therefore, it is possible to calculate the lateral position by tracking the painted line recognized by the painted line recognizing unit 22. Here, however, it is assumed that the travel lane recognized by the position integrating unit 27 is incorrect.

At the position 2001, the line type point $Pt_1$ is set to −10 because the type of the dividing line of the map and the type recognized by the line type recognizing unit 23 are different from each other. $Pt_2$ is set to −8 because a position relatively close to the lane center that is 20 cm away from the lane center is calculated for the in-lane position point $Pt_e$. Both the painted line recognition possibility point $Pt_3$ and the continuity correction possibility point $Pt_4$ are set to 0 because the painted line recognition and the continuity correction have been successfully performed. The lane change to outside road point $Pt_5$ is set to 0 because no lane change has been determined by the lane change state determining unit 17. From the above results, the difference point is calculated to be −2, and as a result, the latest reliability point is calculated to be 148 points. Accordingly, the position integrating unit 27 selects the output result of the image-based vehicle position calculating unit 26 even immediately after that. Subsequently, the calculation of the reliability point is successively performed in the same manner.

At position 2002, a lane change to a right lane is determined by the lane change state determining unit 17 and is regarded as the lane change to outside the road, so that the lane change to outside road point $Pt_5$ is set to 0, and the latest reliability point is calculated to be 0 point. Therefore, the initialization position by the on-map vehicle position initializing unit 9 is selected. At this time, the image-based lateral position accumulated by the vehicle lateral position calculating unit 28 is reset.

When the position 2003 is reached, the calculated reliability point becomes equal to or greater than 100 that is the threshold, so that it is determined that the vehicle position input from the on-map vehicle position initializing unit 9 becomes stable, and consistency with the line type information recognized by the line type recognizing unit 23 has been confirmed, which makes a transition to a mode where the output result of the image-based vehicle position calculating unit 26 is selected.

Subsequently, when the position 2004 is reached, a lane change to a right lane is determined by the lane change state determining unit 17, so that the image-based vehicle position calculating unit 26 swiftly calculates an own vehicle position after the lane change, allowing the position integrating unit 27 to calculate the own vehicle position in response to a lane change.

<Effect>

In the third embodiment, the reliability of the current travel lane is determined based on the time series of the line type of the painted line recognized by the line type recognizing unit 23, the time series of the position relation between the left and right dividing lines of the travel lane contained in the map acquired from the map information acquiring unit 11 and the on-map vehicle position output from the position integrating unit 27, and the duration of the time the painted line recognizing unit 22 has failed to recognize the painted line or the painted line continuity correcting unit 16 has determined that the painted line cannot be corrected. When the reliability is equal to or greater than the threshold, the lateral position (the travel lane and the in-lane lateral position) is determined based on the imaging result of the camera, and when the reliability is less than the threshold, the output of the on-map vehicle position initializing unit 9 is selected, and it waits until the reliability becomes equal to or greater than the threshold, which makes it possible to prevent an error in recognition of the travel lane due to a position error in the on-map vehicle position initializing unit 9 and an error in determination of the travel lane based on the subsequent imaging result of the camera under the influence of the error in recognition.

Note that the present invention can be implemented by any combination of the embodiments within the scope of the present invention, and each of the embodiments can be modified or omitted as appropriate.

Although the present invention has been described in detail, the above descriptions are illustrative in all aspects, and the present invention is not limited by the descriptions. It is understood that innumerable modifications not illustrated can be envisaged without departing from the scope of the present invention.

EXPLANATION OF REFERENCE SIGNS

1: vehicle position estimation system
2: vehicle position estimation apparatus
3: road imaging device
4: image information acquiring unit
5: painted line recognizing unit
6: painted line recognition result processing unit
7: vehicle lateral position calculating unit
8: on-map vehicle position calculating unit
9: on-map vehicle position initializing unit
10: vehicle forward travel distance calculating unit
11: map information acquiring unit
12: satellite positioning device
13: vehicle position estimation system
14: vehicle position estimation apparatus
15: painted line recognition result processing unit
16: painted line continuity correcting unit
17: lane change state determining unit
18: dividing line position calculating unit
19: time-series data accumulating unit
20: vehicle position estimation system
21: vehicle position estimation apparatus
22: painted line recognizing unit
23: line type recognizing unit
24: on-map vehicle position calculating unit
25: travel lane reliability estimating unit
26: image-based vehicle position calculating unit
27: position integrating unit
28: vehicle lateral position calculating unit

The invention claimed is:

1. A vehicle position estimation apparatus comprising a processor and a memory configured to store instructions executable by the processor, the processor configured to:
  acquire image information obtained through taking an image of a road in front of a vehicle;
  recognize relative positions of left and right painted lines with respect to the vehicle based on the acquired image information, the left and right painted lines being painted on the road;
  calculate whether the vehicle has made a lane change and a direction of the lane change when the vehicle has made the lane change, the recognized relative positions of left and right sides being positions of left and right dividing lines defining a lane of the road;
  acquire map information containing at least a lane connection relation that is a connection relation of the lane in an extending direction of the road;
  calculate a lane where the vehicle is in travel and a vehicle lateral position that is a lateral position of the vehicle in the lane based on the calculation of whether the vehicle has made the lane change and the direction of the lane change and the acquired lane connection relation;
  calculate a forward travel distance that is a distance by which the vehicle has traveled forward;
  calculate an on-map position of the vehicle on the road based on the acquired map information; the calculated lane where the vehicle is in travel and the vehicle lateral position, and the calculated forward travel distance;
  make a correction to make the positions of the left and right painted lines temporally continuous based on the recognized relative positions of the left and right sides;
  determine a state of the lane change of the vehicle containing the direction of the lane change based on the corrected relative positions of the left and right painted lines and past positions of the left and right dividing lines;
  calculate the positions of the left and right dividing lines based on the corrected relative positions of the left and right painted lines and the determined state of the lane change of the vehicle;
  accumulate the calculated positions of the left and right dividing lines as time-series data, wherein the acquired map information contains a lane width that is a width of the lane;
  determine that the right painted line corresponds to the left dividing line at a current time when a difference between the position of the left dividing line that is a dividing line adjacent to a left side of the vehicle obtained a predetermined time before the current time accumulated in the time-series data and the position of the right painted line that is a painted line adjacent to a right side of the vehicle at the current time is within a predetermined distance;
  calculate the position of the right dividing line that is a dividing line adjacent to the right side of the vehicle at the current time based on the left dividing line at the current time and the lane width contained in the map information;
  determine that the left painted line corresponds to the right dividing line at a current time when a difference between the position of the right dividing line obtained a predetermined time before the current time accumulated in the time-series data and the position of the left painted line that is a painted line adjacent to the left side of the vehicle at the current time is within a predetermined distance; and calculate the position of the left dividing line at the current time based on the right dividing line at the current time and the lane width.

2. The vehicle position estimation apparatus according to claim 1, wherein the processor is further configured to:

calculate a crossing forward travel distance that is a forward travel distance for the vehicle to cross the left dividing line or the right dividing line and a crossing required time that is a time required for the vehicle to cross the left dividing line or the right dividing line based on the time-series data obtained during a predetermined time including a current time accumulated in the time-series data and the positions of the left dividing line and the right dividing line after the correction and determine whether the vehicle starts the lane change based on the crossing forward travel distance and the crossing required time and, when the vehicle starts the lane change, a direction of the lane change, determine that, when the position of the painted line after the correction in the direction of the lane change is equal to or greater than a first threshold after the vehicle starts the lane change, the vehicle has completed the lane change, and determine that, when the position of the painted line after the correction in the direction of the lane change is equal to or less than a second threshold after the vehicle starts the lane change, the vehicle has canceled the lane change.

3. The vehicle position estimation apparatus according to claim 2, wherein the processor is further configured to:

calculate, when the processor determines that the lane change whose direction is left has been completed, the positions of the left dividing line and the right dividing line adjacent to both the sides of the vehicle after the lane change based on the left dividing line after the correction and the lane width contained in the map information, and calculate, when the processor determines that the lane change whose direction is right has been completed, the positions of the left dividing line and the right dividing line adjacent to the vehicle after the lane change based on the right dividing line after the correction and the lane width contained in the map information.

4. The vehicle position estimation apparatus according to claim 1, wherein the processor is further configured to, output an initialization position used for initializing a stored on-map position of the vehicle based on a positioning result obtained by positioning means different from the processor, estimate travel lane reliability based on the calculated on-map position of the vehicle, calculate an image-based vehicle position based on the calculated forward travel distance and the calculated lateral position of the vehicle, and determine which of the initialization position and the calculated image-based vehicle position is selected as a vehicle position in accordance with the estimated travel lane reliability.

5. The vehicle position estimation apparatus according to claim 4, the processor is further configured to:

calculate the travel lane reliability at a current time based on at least one of a time series of a position relation between the left and right dividing lines contained in the acquired map information and the on-map position of the vehicle, duration of a state where the processor determines that the painted lines are not successfully-recognizable or duration of a state where the processor determines that the painted lines are not correctable, and determine whether the on-map position of the vehicle is located outside the road due to the determined lane change determined.

6. The vehicle position estimation apparatus according to claim 5, wherein the processor is further configured to:

determine a line type of each of the left and right painted lines recognized based on the acquired image information, and calculate the travel lane reliability at a current time based on a time series of the recognized line type of each of the painted lines.

* * * * *